(12) United States Patent
Ward et al.

(10) Patent No.: US 12,110,672 B2
(45) Date of Patent: *Oct. 8, 2024

(54) SYSTEM AND METHOD FOR ENABLING WASTE DISPOSER WITH PERMANENT MAGNET MOTOR TO BE COUPLED TO ALTERNATIVE ELECTRIC POWER SOURCES

(71) Applicant: INSINKERATOR LLC, Benton Harbor, MI (US)

(72) Inventors: Jeffrey Ward, Kenosha, WI (US); Walter Bennage, Pleasant Prairie, WI (US); Dane Hofmeister, Mount Pleasant, WI (US)

(73) Assignee: INSINKERATOR LLC, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/165,518

(22) Filed: Feb. 2, 2021

(65) Prior Publication Data

US 2021/0238834 A1      Aug. 5, 2021

Related U.S. Application Data

(60) Provisional application No. 62/969,466, filed on Feb. 3, 2020.

(51) Int. Cl.
*E03C 1/266* (2006.01)
*B02C 18/00* (2006.01)
(Continued)

(52) U.S. Cl.
CPC ........ *E03C 1/2665* (2013.01); *B02C 18/0092* (2013.01); *B02C 25/00* (2013.01);
(Continued)

(58) Field of Classification Search
CPC ... B02C 18/0092; E03C 1/2665; H01B 9/006; H01R 13/10; H01R 24/22; H01R 25/006; H02G 3/0683; H02M 7/217
See application file for complete search history.

(56) References Cited

U.S. PATENT DOCUMENTS

| 2,244,402 A | 6/1941 | Powers |
| 2,477,686 A | 8/1949 | Coss |

(Continued)

FOREIGN PATENT DOCUMENTS

| CN | 2429070 | 5/2001 |
| CN | 101911623 | 12/2010 |

(Continued)

OTHER PUBLICATIONS

Second Chinese Office Action dated Aug. 31, 2023 for Chinese Patent Application No. 2020800809950 (23 pages).

(Continued)

*Primary Examiner* — Bobby Yeonjin Kim
(74) *Attorney, Agent, or Firm* — Amundsen Davis, LLC

(57) ABSTRACT

Food waste disposer systems and related systems for coupling food waste disposer systems having permanent magnet (PM) motors to electrical power sources, and related coupling and configuration methods, are disclosed herein. In at least one example embodiment, a food waste disposer system includes a PM motor, an AC-to-DC converter having AC input and DC output ports, a housing, a power cord connection structure supported at least indirectly upon the housing, an adapter, and a power cord including a first plug configured to be coupled to the connection structure. The disposer system can be selectively implemented either in a first installation environment including a wall outlet by way of coupling the first plug to the connection structure, or in a second installation environment including a hardwired power cable by coupling additional lead wires of the hard- (Continued)

wired power cable to the adapter and further coupling the adapter to the connection structure.

17 Claims, 16 Drawing Sheets

(51) Int. Cl.
| | |
|---|---|
| B02C 25/00 | (2006.01) |
| H01B 9/00 | (2006.01) |
| H01R 13/10 | (2006.01) |
| H01R 24/22 | (2011.01) |
| H01R 25/00 | (2006.01) |
| H02G 3/06 | (2006.01) |
| H02K 21/14 | (2006.01) |
| H02M 7/217 | (2006.01) |

(52) U.S. Cl.
CPC ............. *H01B 9/006* (2013.01); *H01R 13/10* (2013.01); *H01R 24/22* (2013.01); *H01R 25/006* (2013.01); *H02G 3/0683* (2013.01); *H02K 21/14* (2013.01); *H02M 7/217* (2013.01)

(56) References Cited

U.S. PATENT DOCUMENTS

| | | | |
|---|---|---|---|
| 2,579,400 | A | 12/1951 | Schindler |
| 2,642,232 | A | 6/1953 | Drew |
| 2,657,397 | A | 11/1953 | Drew |
| 2,678,775 | A | 5/1954 | Simmons |
| 2,850,244 | A * | 9/1958 | James .................. E03C 1/2665 241/32.5 |
| 2,860,834 | A | 11/1958 | Hammes |
| 2,961,172 | A | 11/1960 | Wieczorek et al. |
| 2,979,274 | A | 4/1961 | Tull |
| 3,090,900 | A | 5/1963 | Porter et al. |
| 3,207,837 | A | 9/1965 | Brezosky |
| 3,423,660 | A | 1/1969 | McClure |
| 3,425,637 | A | 2/1969 | Enright et al. |
| 3,464,638 | A | 9/1969 | Enright et al. |
| 3,504,863 | A | 4/1970 | Burkland et al. |
| 4,473,789 | A | 9/1984 | Hildebrandt et al. |
| 6,071,132 | A | 6/2000 | Cook |
| 6,082,643 | A | 7/2000 | Kovacs |
| 6,200,155 | B1 * | 3/2001 | Chudkosky ............ H01R 31/06 174/53 |
| 6,610,942 | B1 | 5/2003 | Anderson et al. |
| 6,719,228 | B2 | 4/2004 | Berger et al. |
| 6,735,791 | B1 | 5/2004 | Lordahl et al. |
| 6,905,360 | B2 | 6/2005 | Berger et al. |
| 7,021,574 | B2 | 4/2006 | Berger et al. |
| 7,210,949 | B2 | 5/2007 | Duncan et al. |
| 7,264,188 | B2 | 9/2007 | Anderson et al. |
| 7,503,514 | B2 | 3/2009 | Berger et al. |
| 7,744,419 | B2 | 6/2010 | Blum et al. |
| 7,757,981 | B2 | 7/2010 | Anderson et al. |
| 7,936,242 | B2 | 5/2011 | Carpenter |
| 8,382,492 | B2 * | 2/2013 | Hering ................ A47L 15/4251 439/924.1 |
| 8,794,987 | B2 | 8/2014 | Classen et al. |
| 9,145,666 | B2 | 9/2015 | Hammer |
| 9,642,035 | B2 | 5/2017 | Fang et al. |
| 9,968,940 | B2 | 5/2018 | Hartmann et al. |
| 10,063,411 | B2 | 8/2018 | Khotimsky et al. |
| 10,559,907 | B1 * | 2/2020 | Baldwin ............ H01R 13/5833 |
| 10,981,178 | B2 | 4/2021 | Britto |
| 11,441,302 | B2 | 9/2022 | Reidel et al. |
| 11,532,909 | B2 * | 12/2022 | Weaver ................. H01R 4/48 |
| 2004/0053523 | A1 | 3/2004 | Berger |
| 2004/0077224 | A1 * | 4/2004 | Marchese ................ H01R 4/30 439/696 |
| 2004/0178289 | A1 | 9/2004 | Jara-Almonte et al. |
| 2006/0038047 | A1 | 2/2006 | Anderson et al. |
| 2006/0144975 | A1 | 7/2006 | Anderson et al. |
| 2010/0130042 | A1 | 5/2010 | Gray |
| 2014/0070036 | A1 | 3/2014 | Hammer |
| 2015/0115081 | A1 * | 4/2015 | Gormley ............... E03C 1/2665 248/230.5 |
| 2015/0380877 | A1 | 12/2015 | McRae |
| 2018/0123895 | A1 | 5/2018 | Khasnabish et al. |
| 2019/0013714 | A1 | 1/2019 | DeYoung |
| 2019/0210036 | A1 | 7/2019 | Chavez |
| 2021/0032853 | A1 | 2/2021 | Reidel et al. |
| 2021/0087801 | A1 | 3/2021 | Ward et al. |
| 2022/0120069 | A1 | 4/2022 | Reidel et al. |
| 2022/0356687 | A1 | 11/2022 | Lines |
| 2022/0381016 | A1 | 12/2022 | Dan et al. |

FOREIGN PATENT DOCUMENTS

| | | |
|---|---|---|
| CN | 203206043 | 9/2013 |
| CN | 103503377 | 1/2014 |
| CN | 104728182 | 6/2015 |
| CN | 204753748 | 11/2015 |
| CN | 205617508 | 10/2016 |
| CN | 205900911 | 1/2017 |
| CN | 106714972 A | 5/2017 |
| CN | 107713770 | 2/2018 |
| CN | 208423310 | 1/2019 |
| CN | 111218964 | 6/2020 |
| CN | 115038847 | 9/2022 |
| CN | 218894157 | 4/2023 |
| DE | 202016000137 | 3/2016 |
| DE | 102015120283 | 5/2017 |
| DE | 102005040241 | 11/2021 |
| EP | 2701245 | 2/2014 |
| GB | 745978 | 3/1956 |
| GB | 759590 | 10/1956 |
| GB | 1120289 | 7/1968 |
| GB | 2392636 | 3/2004 |
| JP | 4968711 B2 | 7/2012 |
| KR | 20010069957 | 7/2001 |
| WO | 2007056631 A2 | 5/2007 |

OTHER PUBLICATIONS

Communication Pursuant to Rules 161(1) and 162 from the European Patent Office for Application No. 20786640.1 dated Apr. 8, 2022 (3 pages).
Response filed on Oct. 17, 2022 in the European Patent Office to Communication Pursuant to Rules 161(1) and 162 from the European Patent Office for Application No. 20786640.1 dated Apr. 8, 2022 (16 pages).
Chinese Office Action dated Mar. 15, 2023 for Chinese Patent Application No. 2020800809950 with English Translation (18 pages).
Response filed on Jul. 28, 2023 to Chinese Office Action dated Mar. 15, 2023 for Chinese Patent Application No. 2020800809950 with English Translation and Claims as amended in Chinese Response (26 pages).
Bosch, "New 300/500/800 Bosch Dishwasher Installation—Overview," brochure (Apr. 10, 2013) pp. 1-6, http://askboschbestbuy.com/wp-content/uploads/sites/02/2013/05/Power-Cord-Installation.pdf.
PCT/US2020/051528 International Search Report and Written Opinion of the International Searching Authority dated Dec. 2, 2020 (12 pages).
PCT/US2021/016231 International Search Report and Written Opinion of the International Searching Authority dated Apr. 21, 2021 (14 pages).
Chinese Office Action dated Dec. 7, 2023 for Chinese Patent Application No. 2021800122168 (17 pages with partial translation).
International Search report and Written Opinion for International Application No. PCT/US2023/029927 from WIPO dated Nov. 30, 2023 (15 pages).
International Search report and Written Opinion for International Application No. PCT/US2023/029928 from WIPO dated Nov. 30, 2023 (16 pages).

(56) References Cited

OTHER PUBLICATIONS

Non-Final Patent Office Action of U.S. Patent Office Concerning U.S. Appl. No. 17/025,245 dated Aug. 31, 2023 (7 pages).
Amendment Submitted in Regard to U.S. Appl. No. 17/025,245 dated Nov. 8, 2023 (9 pages).
CNIPA Decision of Rejection dated Apr. 17, 2024 for Chinese Patent Application No. 2020800809950 (21 pages).
Apr. 19, 2024 Response to Chinese Office Action (Office Action dated Dec. 7, 2023) for Chinese Patent Application No. 2021800122168 (30 pages).
Jun. 25, 2024 Decision of Rejection received from the CNIPA for Chinese Patent Application No. 2021800122168 (15 pages).
Jun. 27, 2024 Request for Reexamination against Decision of Rejection filed with the CNIPA for Chinese Patent Application No. 202080089950 (21 pages).

* cited by examiner

SYSTEM AND METHOD FOR ENABLING WASTE DISPOSER WITH PERMANENT MAGNET MOTOR TO BE COUPLED TO ALTERNATIVE ELECTRIC POWER SOURCES

CROSS REFERENCE TO RELATED APPLICATIONS

This application claims priority to and the benefit of U.S. Provisional Application No. 62/969,466, filed on Feb. 3, 2020, the entire contents of which are hereby incorporated by reference in their entirety.

FIELD

The present disclosure relates to waste disposers such as food waste disposers employing permanent magnet motors and, more particularly, to systems for use in or in conjunction with such waste disposers by which those waste disposers can be coupled to electric power sources, as well as to waste disposers comprising such systems, and to methods of coupling waste disposers to, or configuring waste disposers for coupling to, electrical power sources.

BACKGROUND

Food waste disposers are used to comminute food scraps into particles small enough to pass through household drain plumbing. Referring to FIG. 1 (Prior Art), a perspective bottom view of a conventional food waste disposer 100 is shown. As illustrated, the food waste disposer 100 includes an enclosure 102, a cylindrical stator band 104, and a lower end frame (LEF) 106. It should be appreciated that the food waste disposer 100 can be mounted to and beneath a sink, such as a kitchen sink (not shown). When so mounted, the food waste disposer 100 will typically be in a position that is inverted relative to that shown in FIG. 1, such that the LEF 106 will be at the bottom of the food waste disposer.

In general, the food waste disposer 100 can be understood as including a food conveying section, a motor section, and a grinding section. The food conveying section is generally positioned at a location corresponding to the location of the enclosure 102, at or near the top of the food waste disposer 100. The motor section is generally positioned at a location corresponding to and within the stator band 104, at or near the bottom of the food waste disposer 100. The grinding section is disposed between the food conveying section and the motor section. It should be appreciated that the food conveying section includes an inlet for receiving food waste and fluid (e.g., water), and conveys the food waste to the grinding section. The motor section includes a motor imparting rotational movement to a motor shaft to operate the grinding section.

The type of electrical installation for food waste disposers such as the food waste disposer 100 varies. Most newer homes have a standard electrical power outlet (e.g., a wall outlet) near the disposer, to which the disposer can be coupled so as to receive power. However, most older homes (pre-1970's) have a Romex/BX cable extending from a wall of the home, which can be coupled and terminated directly to the disposer in a hardwired manner. Out of all homes, it is estimated that 60% of homes with a disposer have hardwiring and that the remaining 40% use a power outlet located in the sink cabinet.

Notwithstanding such common implementations of food waste disposers within homes, there are various concerns, problems, or disadvantages associated with each of these implementations. For food waste disposers that are sold with a power cord (e.g., for coupling to a wall outlet), there can arise any of several issues when implementing such disposers. For example, when implementing such a food waste disposer in a home that is equipped with a Romex/BX cable, the installed cord would have to be removed to permit hardwired installation via that cable, or alternatively an electrician or qualified person would have to install an outlet box per electrical code in the sink cabinet. Either of these tasks can be costly and inconvenient. Also, attaching a cord during the disposer assembly process can disrupt manufacturing flow in a factory or make subsequent manufacturing processes more difficult. Because of this, the cording operation is sometimes done as a secondary operation, which is typically less efficient. Further, power cords that are attached to or formed as part of food waste disposers can be damaged during shipping and handling of those disposers.

Additionally, for food waste disposers that are sold without a cord, one or more other issues can arise when implementing such disposers. For example, when implementing such a food waste disposer in a home that has an electrical wall outlet but lacks a Romex/BX cable connection, a power cord would have to be installed with respect to the disposer. This may require the installer to go back to the store given that no cord is provided with the disposer. Additionally, installation errors can lead to warranty issues and undesirable customer experiences. In some cases, installers may mistakenly remove the wire shield, which may allow wires to impinge or come in contact with the rotor and prevent the disposer from working properly. Generally speaking, in contrast to food waste disposers that include power cords (are "pre-corded") and that are implemented in homes with wall outlets, the installation of an uncorded disposer can be difficult for the average homeowner and involve added cost. Also, stores generally do not have enough shelf space to stock the various SKU's of disposers in both uncorded and pre-corded versions.

Additionally, another concern associated with both uncorded and pre-corded food waste disposers relates to the typical under-sink environments within which such disposers are implemented. Often, after a food waste disposer is installed in relation to a sink, there is limited space under the disposer and it can be difficult to access. Therefore, when attaching a power cord or Romex/BX cable to a food waste disposer such as the food waste disposer 100, this is typically done before the disposer is installed to the sink. Yet this can be especially challenging in homes having Romex/BX cables, since in such an environment there is typically a fixed length of the Romex/BX cable/wire to work with, relative to where the cable enters the sink cabinet, and consequently the disposer must be positioned close enough to make the desired connections.

The difficulties associated with the installation of uncorded food waste disposers in homes having Romex/BX cables can be further exacerbated by the complexity of the processes by which installation is achieved. In this regard, FIG. 2 (Prior Art) shows a perspective top view of the LEF 106 of FIG. 1 to illustrate components of the food waste disposer 100 that are particularly involved with or implicated by a conventional installation process of the food waste disposer 100 when installed in relation to a Romex/BX cable. Additionally FIG. 3 (Prior Art) shows a flow chart 320 illustrating steps of the conventional installation process, and FIGS. 4A through 4L (Prior Art) are further cutaway bottom perspective views of portions of the LEF 106 at different times during the performing of that conventional installation process that particularly correspond to various ones of the steps of the flow chart 320 of FIG. 3.

More particularly, referring to FIG. 3 and FIG. 4A, it should be recognized that the LEF 106 of the food waste disposer 100 at a start step 300 of the installation process represented by the flow chart 320 includes a terminal cover 400, which is positioned along an underside or bottom surface 418 of the LEF. Upon commencement of the installation process, the first step 301 then is to remove the terminal cover 400, so that a terminal cover opening 402 is formed in the LEF 106 as shown in FIG. 4B. Next, at a step 302 of the flow chart 320, an installer screws a Romex/BX coupler 404 into the LEF 106. The Romex/BX coupler 404 particularly can be inserted into an orifice 406 of the LEF 106 (as visible in FIG. 4B), from the bottom surface 418 of the LEF, so as to be affixed to the LEF 106 as illustrated in FIG. 4C. As illustrated, the Romex/BX coupler 404 includes first and second surface portions 408 and 410, respectively, as well as first and second screws 412 and 414, respectively, where the screws link the two surface portions and can cause those surface portions to become closer to or farther from one another depending upon the positioning of the screws.

Following the step 302, at a step 303 the installer pulls motor wires 416 out through the terminal cover opening 402 as illustrated by FIG. 4D. Additionally, at a step 304 as shown in FIG. 4E, the installer feeds the Romex/BX cable 420 (and associated lead wires 422 extending within and from an end of the cable as shown in FIG. 4F) through the Romex/BX coupler 404. Further, at a step 305, the installer pulls the lead wires 422 of the Romex/BX cable 420 (particularly ends thereof) out through the terminal cover opening 402, as shown in FIG. 4F. Next, at a step 306 illustrated by FIG. 4G, a ground screw 424 of the LEF 106 is loosened (e.g., by turning it counter-clockwise) and, at a step 307 illustrated by FIG. 4H, a ground lead wire 426 of the Romex/BX cable (which can be considered one of the lead wires 422) is connected to the ground screw 424 (this can involve tightening, e.g., clockwise rotation, of the ground screw after the ground wire is positioned under the head of the ground screw).

Additionally, at a step 308 and as illustrated by FIG. 4I, the installer connects a first (in this example, white) lead wire 430 of the lead wires 422 of the Romex/BX cable 420 to a first (in this example, white) motor lead wire 432 of the motor wires 416 by way of a first coupler 434. Also, at a step 309 and as illustrated by FIG. 4J, the installer connects a second (in this example, black) lead wire 436 of the lead wires 422 to a second (in this example, black) motor lead wire 438 of the motor wires 416 by way of a second coupler 440. Then, at a step 310 and as illustrated by FIG. 4K, the installer pushes the wires (e.g., all of the end portions of the lead wires 426, 430, 432, 436, and 438, as well as the first and second couplers 434 and 440) through the terminal cover opening 402 into a wiring compartment inside the food waste disposer 100 (e.g., above the bottom surface 418). At this time, the installer then completes the installation process at a step 311, at which the installer secures the Romex/BX coupler 404 to the Romex/BX cable 420 by tightening the screws 412 and 414, and at a step 312, at which the installer re-attaches the terminal cover 400 to the bottom surface 418 of the LEF 106, as illustrated by FIG. 4L (after the steps 311 and 312, the process ends as illustrated by an end step 313).

With respect to waste disposers that have permanent magnet motors, FIGS. 5A-5C (Prior Art) are cutaway bottom perspective views of portions of a LEF 504 of a food waste disposer 500 having a permanent magnet motor at different times during a conventional installation process when installed in relation to a Romex/BX cable. More particularly, referring to FIG. 5A, the food waste disposer 500 conventionally has a power cord 502, and the LEF 504 of the food waste disposer 500 includes a motor cover 506, which forms an underside or bottom surface of the LEF 504.

Upon commencement of the installation process, the first step is to remove the motor cover 506, such as by removing one or more screws 508 and lifting the motor cover 506 away from the LEF 504. FIG. 5B shows the LEF 504 with the motor cover 506 removed. Next, an installer cuts the power cord lead wires 512, leaving cut motor wire ends 514. The cut motor wire ends 514 are operatively connected to the AC input port of an AC-to-DC converter that converts AC power to DC power and delivers the DC power to the permanent magnet motor. The installer removes the power cord 502 and the cut lead wires 512. As shown in FIG. 5C, the installer next attaches a Romex/BX coupler 520 to the portion of the LEF 504 where the power cable 502 was removed, and then inserts a first end 516 of a BX or Romex cable into the LEF 504 through the Romex/BX coupler 520. The first end 516 of a BX or Romex cable includes a plurality of Romex/BX lead wires 518. The Romex/BX coupler 520 can have the same or similar configurations as Romex/BX coupler 404 described with reference to FIG. 4C above, and is configured to provide retention of the BX or Romex cable as well as strain relief. The installer next connects each of the Romex/BX lead wires 518 to a corresponding cut motor wire end 514 using a respective coupler 520, such as a wire nut. The installer next pushes the connected wires (e.g., all of the Romex/BX lead wires 518 connected to cut motor wire ends 514 and the couplers 520) into the wiring compartment inside the LEF 504. At this time, the installer then completes the installation process by securing the Romex/BX coupler 520 to the Romex/BX cable 516 by tightening the screws of the coupler, and re-attaching the motor cover 506 to the bottom surface of the LEF 504.

Accordingly, it would be desirable if an improved system for use in or in conjunction with a food waste disposer or other waste disposer, and/or an improved waste disposer employing such a system, and/or an improved method, could be developed that alleviated or addressed one or more of the above-discussed concerns associated with the installation of conventional waste disposers, and/or alleviated or addressed one or more other concerns or disadvantages, and/or provided one or more advantages by comparison with conventional arrangements.

BRIEF SUMMARY

In at least some example embodiments, the present disclosure relates to a food waste disposer system comprising a permanent magnet (PM) motor, an AC-to-DC converter having an AC input port and a DC output port, where the DC output port is coupled at least indirectly to the PM motor, and a housing including a first side portion and a bottom portion. Additionally, the food waste disposer system also includes a power cord connection structure supported at least indirectly upon the housing, where the power cord connection structure is coupled at least indirectly to the AC input port. The food waste disposer system can be selectively implemented either in a first installation environment including a wall outlet, or in a second installation environment including a hardwired power cable.

In at least some additional example embodiments, the present disclosure relates a food waste disposer system comprising a permanent magnet (PM) motor, an AC-to-DC converter having an AC input port and a DC output port, where the DC output port is coupled at least indirectly to the PM motor, and a housing including a first side portion and a bottom portion. Additionally, the food waste disposer system also includes a power cord connection structure supported at least indirectly upon the housing, where the power cord connection structure is coupled at least indirectly to the AC input port, an adapter, and a power cord including a first end with a first plug and a second end with a second plug, where the first plug is configured to be coupled to the power cord connection structure. The food waste disposer system can be selectively implemented either in a first installation environment including a wall outlet by way of coupling the first plug to the power cord connection structure, or in a second installation environment including a hardwired power cable by coupling additional lead wires of the hardwired power cable to the adapter and further coupling the adapter to the power cord connection structure.

In at least some further example embodiments, the present disclosure relates to a method of installing a food waste disposer system. The method includes providing the food waste disposer system to an installation environment. The food waste disposer system includes a permanent magnet (PM) motor, an AC-to-DC converter having an AC input port and a DC output port, where the DC output port is coupled at least indirectly to the PM motor, and a housing including a first side portion and a bottom portion. The food waste disposer system also includes a power cord connection structure supported at least indirectly upon the housing, where the power cord connection structure is coupled at least indirectly to the AC input port. The method also incudes determining whether the installation environment for the food waste disposer system includes a wall outlet or a Romex/BX cable. The method further includes coupling, at least indirectly to the power cord connection structure, either: a power cord including a first end with a first plug and a second end with a second plug, wherein the first plug is configured to be coupled to the power cord connection structure and the second end is configured to plug into the wall outlet; or an adapter having a third end with a third plug, wherein the third plug is configured to be coupled to the power cord connection structure, and a coupling assembly including terminals configured to attach to lead wires of the Romex/BX cable.

BRIEF DESCRIPTION OF THE DRAWINGS

Embodiments of food waste disposers (or other waste disposers), and/or systems (or subsystems) employed in or in conjunction with such waste disposers, and/or related methods, are disclosed with reference to the accompanying drawings and are for illustrative purposes only. The waste disposers and related systems and methods encompassed herein are not limited in their applications to the details of construction, arrangements of components, or other aspects or features illustrated in the drawings, but rather such waste disposers and related systems and methods encompassed herein include other embodiments or are capable of being practiced or carried out in various other manners. Like reference numerals are used to indicate like components. In the drawings.

DETAILED DESCRIPTION

Figure 1:
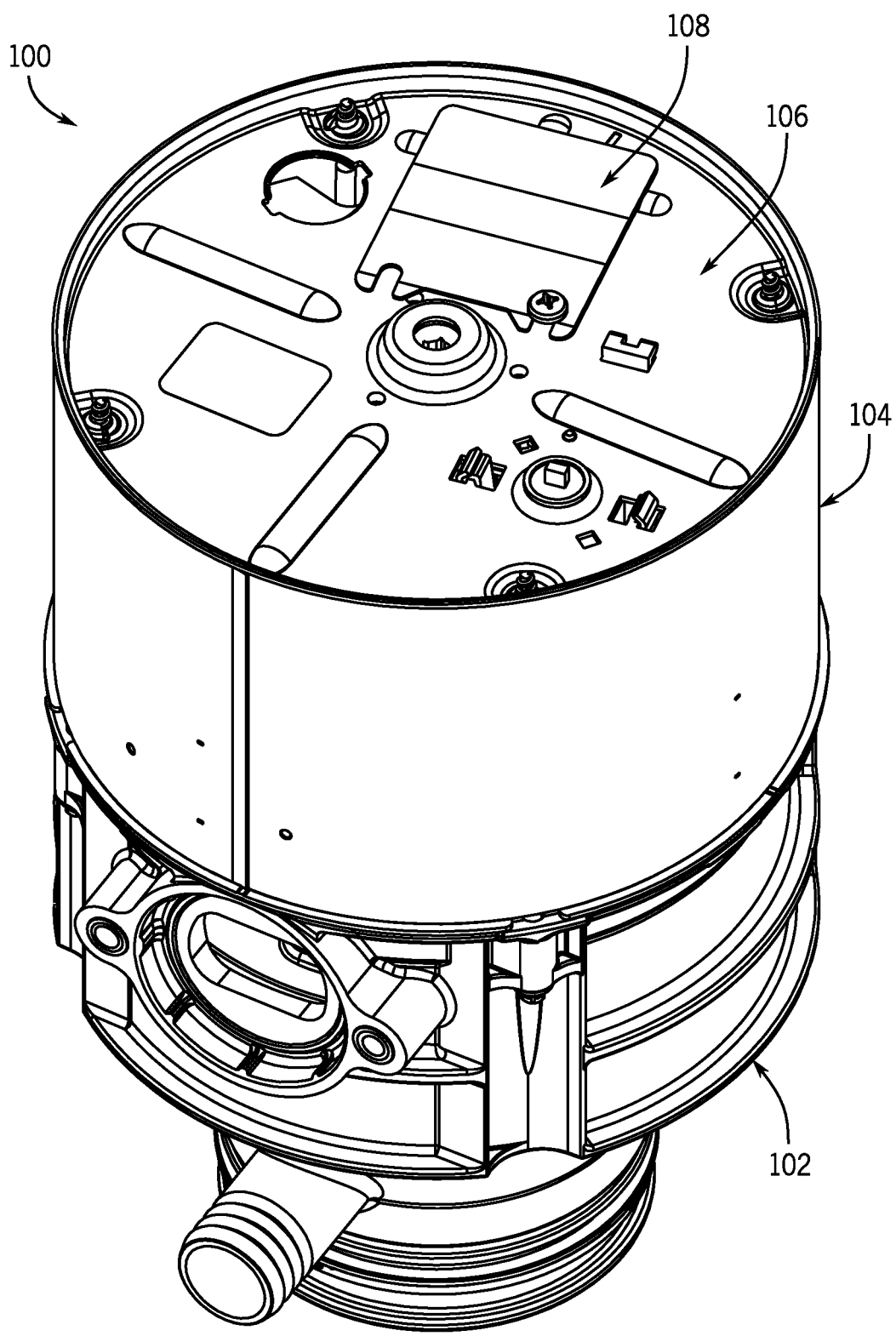
FIG. 1 is a bottom perspective view of a Prior Art food waste disposer, as can be installed in relation to another structure such as a sink.
Figure 2:
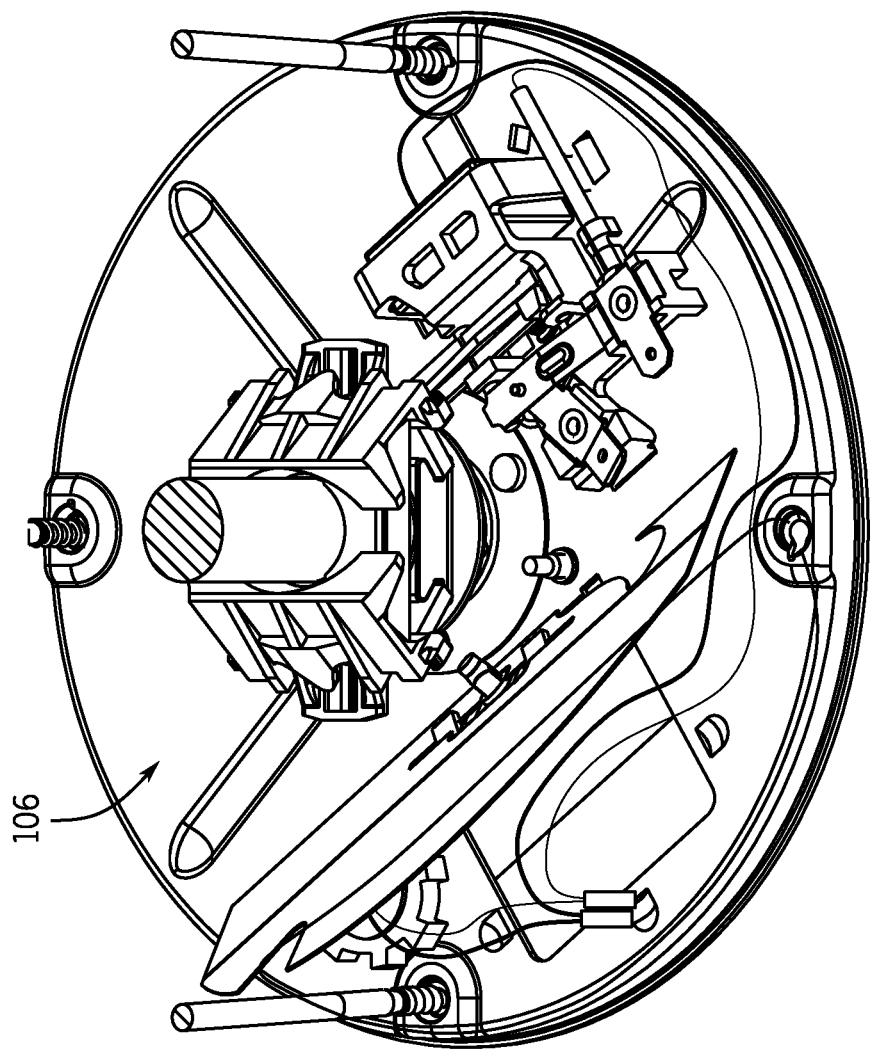
FIG. 2 is a top perspective view of a LEF that is part of the food waste disposer of FIG. 1.
Figure 3:
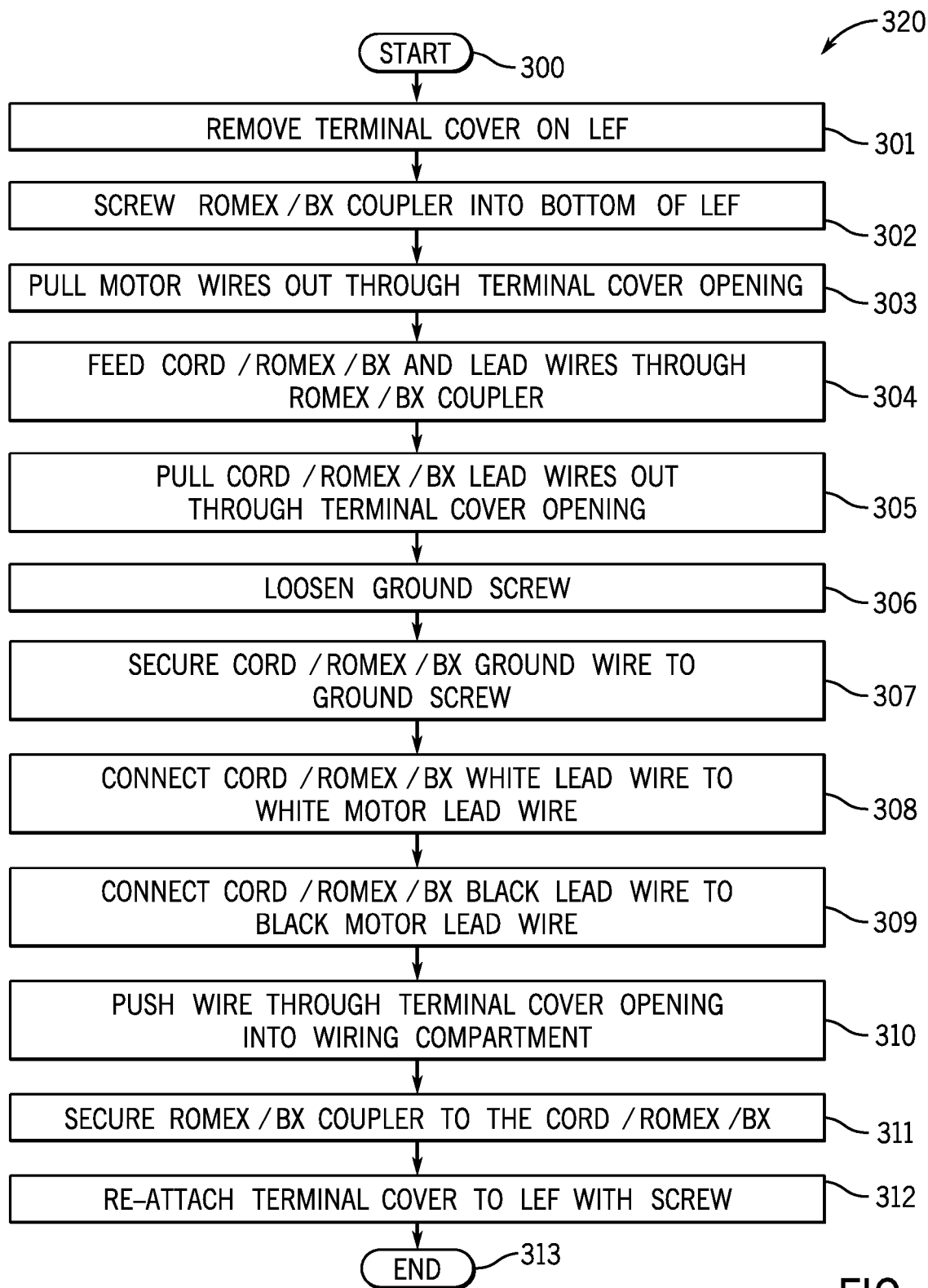
FIG. 3 is a flow chart showing example steps of an installation process by which the food waste disposer of FIG. 1 can be installed in a home having a Romex/BX cable so as to receive electric power.
Figure 4A:
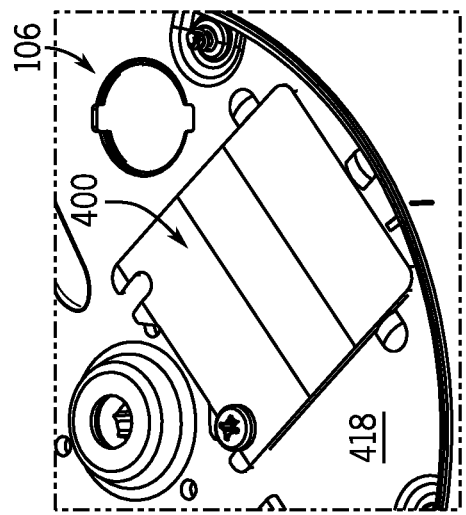
FIGS. 4A through 4L illustrate various ones of the example steps of the installation process of FIG. 3, relative to the LEF and associated components of FIG. 1 and FIG. 2.
Figure 4B:
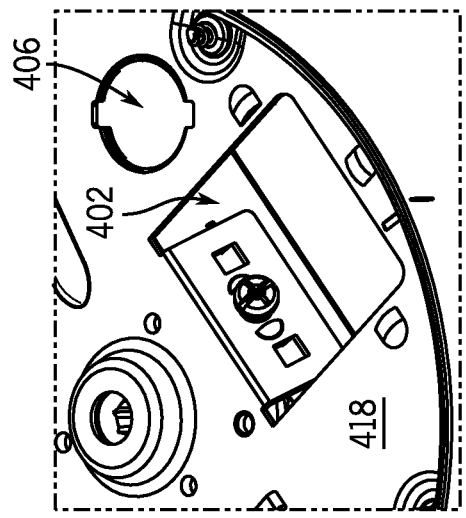
Figure 4C:
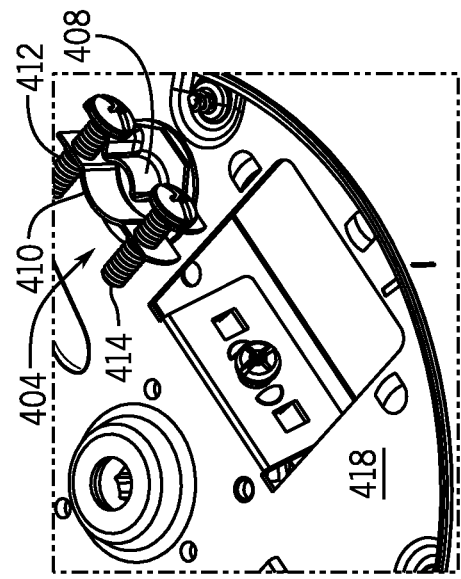
Figure 4D:
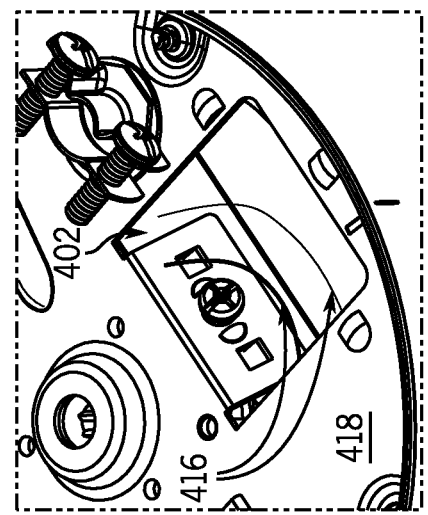
Figure 4E:
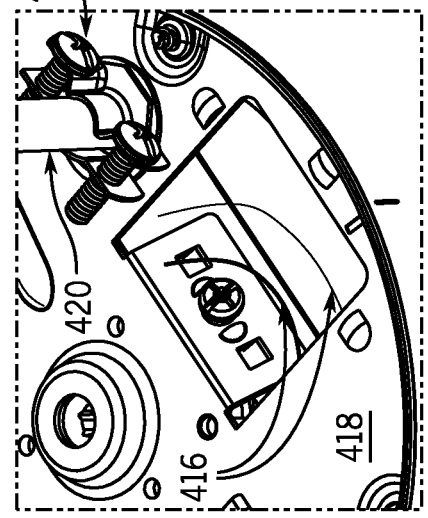
Figure 4F:
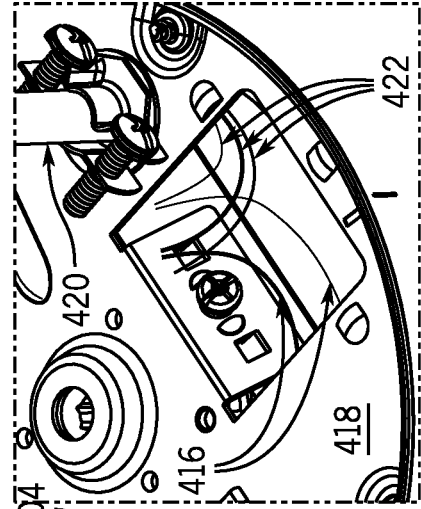
Figure 4G:
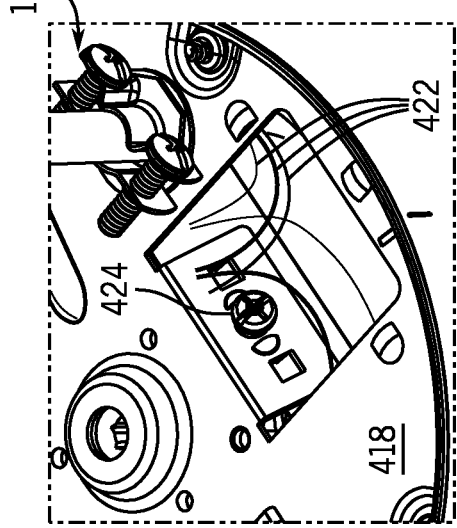
Figure 4H:
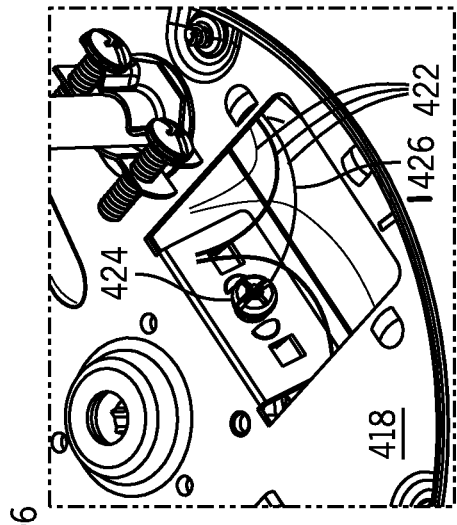
Figure 4I:
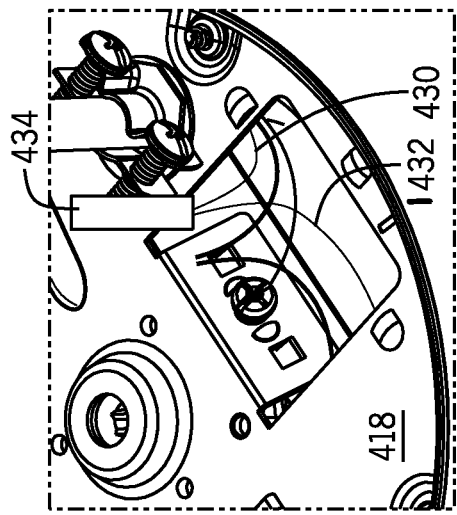
Figure 4J:
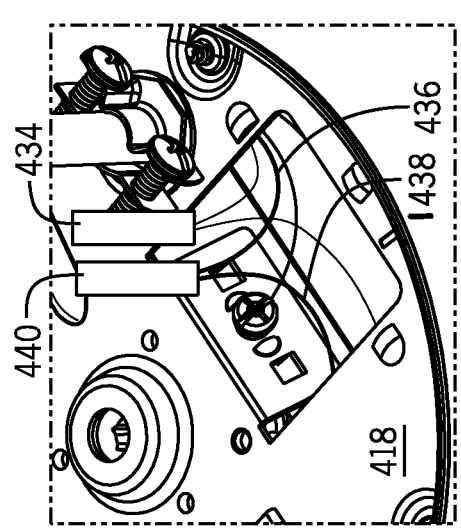
Figure 4K:
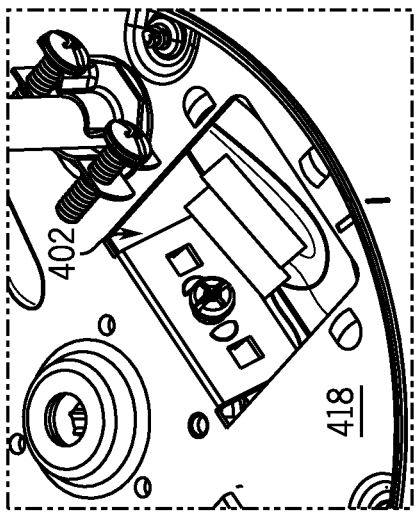
Figure 4L:
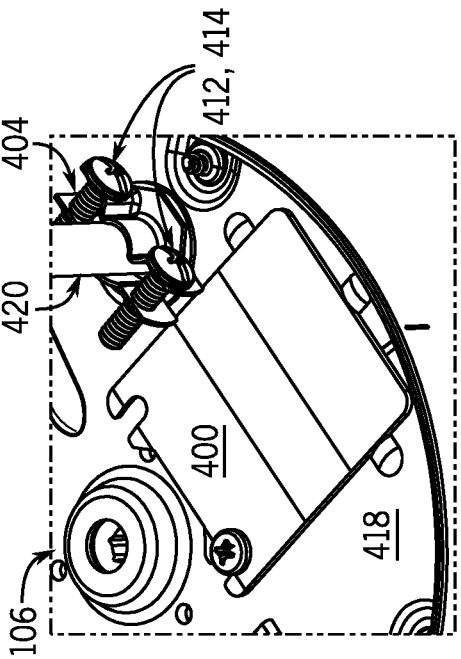
Figure 5A:
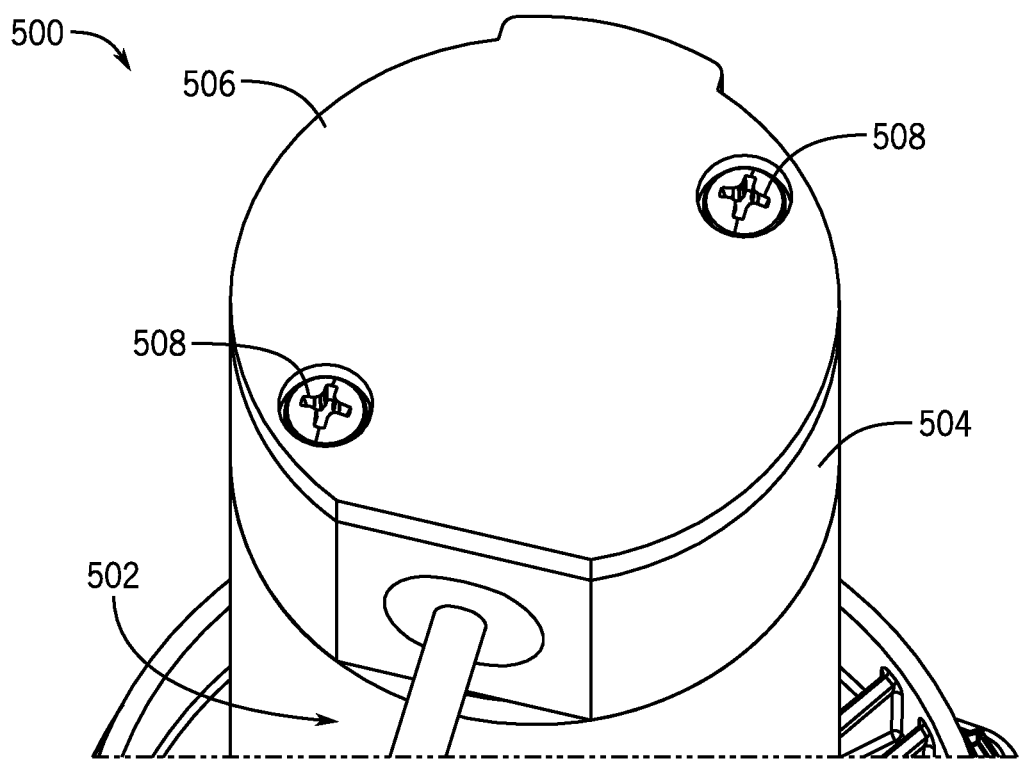
FIG. 5A is a bottom perspective cutaway view of a LEF that is part of a Prior Art food waste disposer having a permanent magnet motor.
Figure 5B:
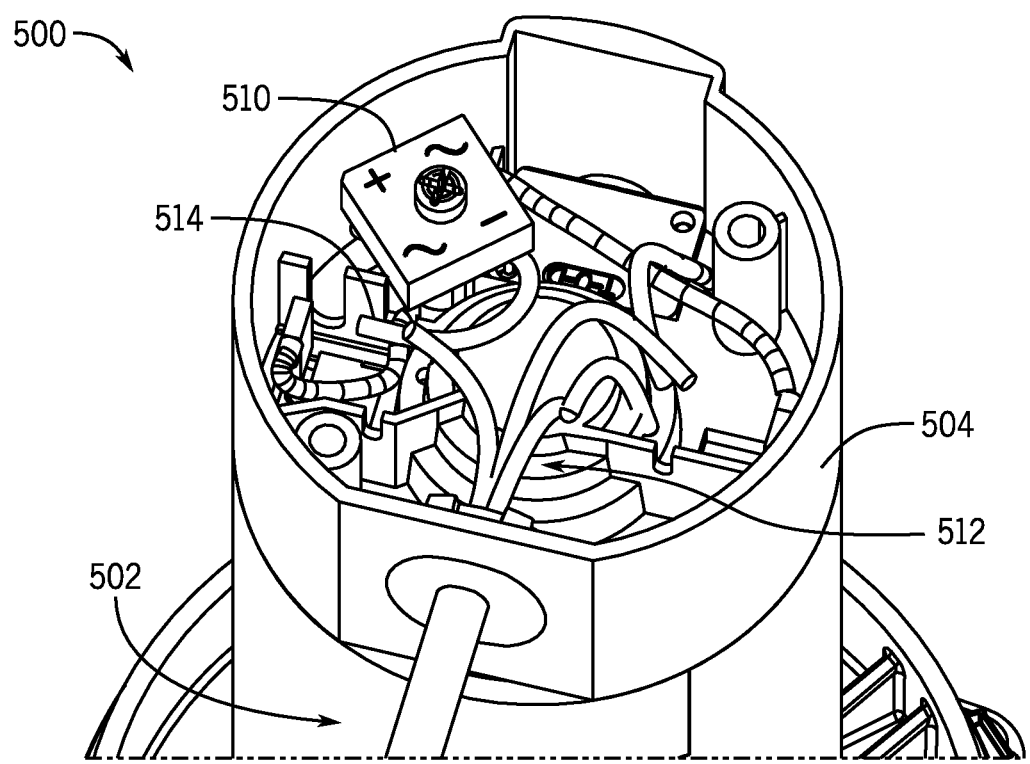
FIG. 5B is a bottom perspective cutaway view of the LEF of FIG. 5A, with the motor cover removed.
Figure 5C:
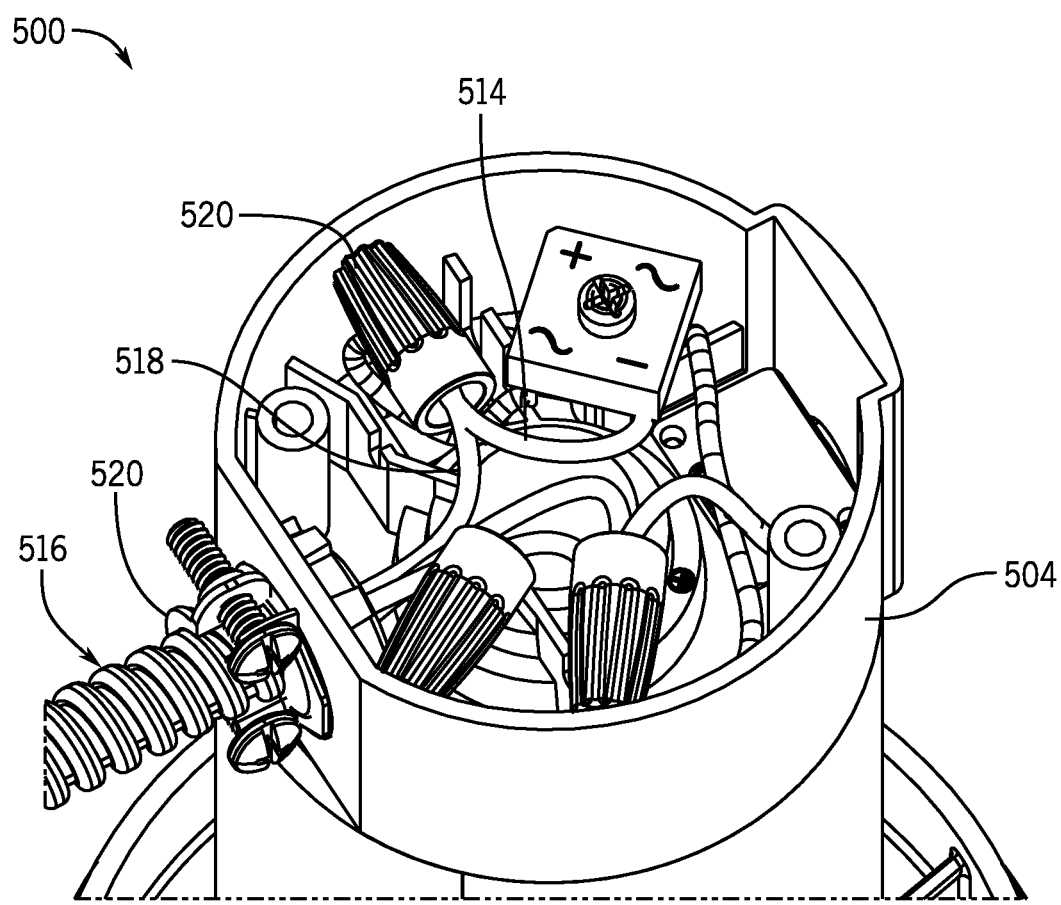
FIG. 5C is a bottom perspective cutaway view of the LEF of FIG. 5A, with e BX/Romex cable installed.

The present disclosure envisions waste disposers such as food waste disposers having permanent magnet (PM) motors, which are configured so as to be capable of either corded installation, in which a cord associated with the waste disposer can be plugged into an electric power (e.g., wall) outlet at the installation site, or hardwired installation, such that electric power can be delivered to the waste disposer via a Romex/BX cable that is present at the installation site. That is, the present disclosure envisions that a given waste disposer having a PM motor can include, or be implemented in conjunction with, a system (or system components) that enables the waste disposer to be installed in either (or both) of two different manners relative to a surrounding environment such as a home (or, alternatively, commercial) installation site so that the given waste disposer can be provided with electric power either by way of an electric power outlet or by way of a Romex/BX cable. Relatedly, the present disclosure envisions methods of installation of waste disposers having PM motors according to which such a waste disposer can be installed in relation to a surrounding environment in either of two manners depending upon whether the waste disposer is to receive electric power from an electric power outlet or via a Romex/BX cable.

The present disclosure is intended to encompass numerous different embodiments and versions of waste disposers having PM motors that are capable of each of corded installation and hardwired installation. FIGS. 6 through 20, which are discussed in detail below, illustrate several example embodiments of food waste disposers having PM motors and associated system components and features, which are configured so as to allow each of the respective food waste disposers to be implemented via corded installation or hardwired installation in accordance with installation methods as also described below. Notwithstanding the particular embodiments shown in FIGS. 6-20, however, the present disclosure is also intended to encompass other embodiments or versions of waste disposers (including food waste disposers and other types of waste disposers) having PM motors that are capable of being implemented in multiple different manners so as to receive power from one or more power sources.

In at least some of the embodiments encompassed herein, the food waste disposers and/or the associated system components and features are particularly configured to facilitate each of corded installation and hardwired installation—that is, configured to make both corded installation and hardwired installation of the same waste disposer easy for an installer. This is in contrast to many conventional waste disposers, for which perhaps one of either corded installation or hardwired installation may be relatively straightforward but the other of those manners of installation may prove to be difficult, unwieldy, or impractical (or impossible). Nevertheless, even though facilitating easy (or relatively easy) installation is one example advantage associated with one or more of the embodiments encompassed herein, the present disclosure is intended to also encompass embodiments that have one or more other advantages in addition to (or instead of) facilitating easy installation.

Figure 6:
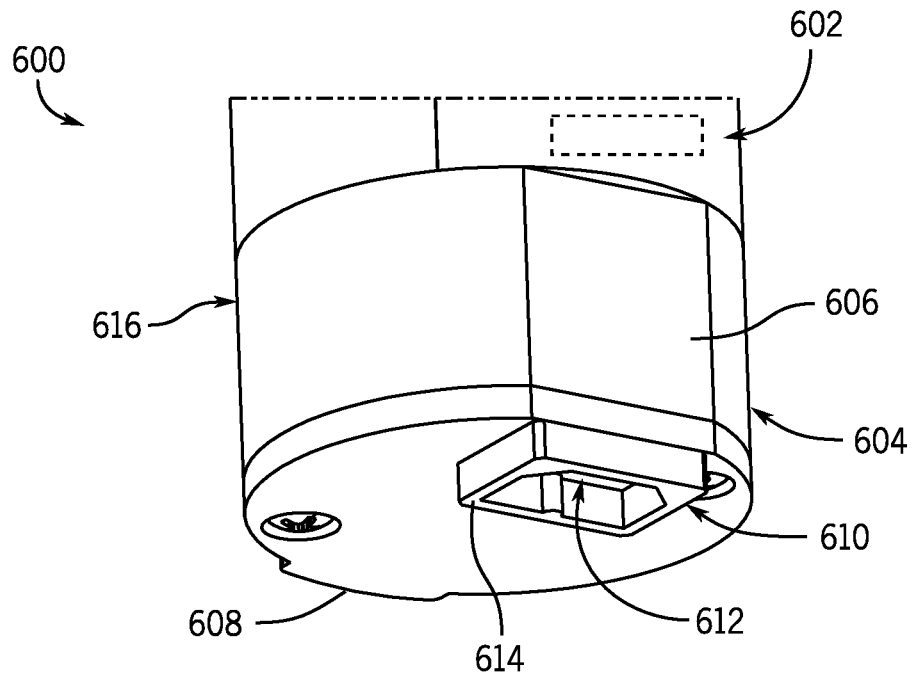
FIG. 6 is a bottom perspective cutaway view of portions of a first example food waste disposer having a permanent magnet motor that, in accordance with a first example embodiment encompassed herein, can be installed in a home so as to receive electric power in either of two alternative manners depending upon whether the home includes a Romex/BX cable or a wall outlet.

Referring particularly to FIG. 6, a bottom perspective cutaway view is provided of portions of a first example food waste disposer 600 that, in accordance with a first example embodiment encompassed herein, can be installed in a home so as to receive electric power, in either of two alternative manners depending upon whether the home includes a Romex/BX cable or a wall outlet. In the present embodiment, the food waste disposer 600 has a permanent magnet (PM) motor 702 (see FIG. 7) that is situated (or supported or housed) within a PM motor compartment 602. In FIG. 6, the PM motor compartment 602 is represented by dashed lines—it should be appreciated that the dashed lines only show the PM motor compartment 602 in a figurative manner and that the actual compartment need not have the particular rectangular size and shape shown by the dashed lines.

FIG. 6 shows the bottom of the food waste disposer 600 in a manner illustrative of how it would be received by the customer, and particularly shows a bottom perspective view of a LEF (or motor LEF) 604 of the food waste disposer 600. In the present embodiment the bottom of the food waste disposer 600, and the LEF 604 thereof, is cylindrical in shape and particularly includes housing 616 that includes a side wall 606 and is bounded at its bottom end by a bottom surface 608, which is shown as being circular or substantially-circular. It should be understood that, although not shown in FIG. 6, the food waste disposer 600 additionally includes an enclosure that is located above the portions particularly shown in FIG. 6 (e.g., above the portion of the side wall 606 that is shown), and includes each of a food conveying section, a motor section, and a grinding section as described above with reference to the food waste disposer 100 of FIG. 1.

Figure 7:
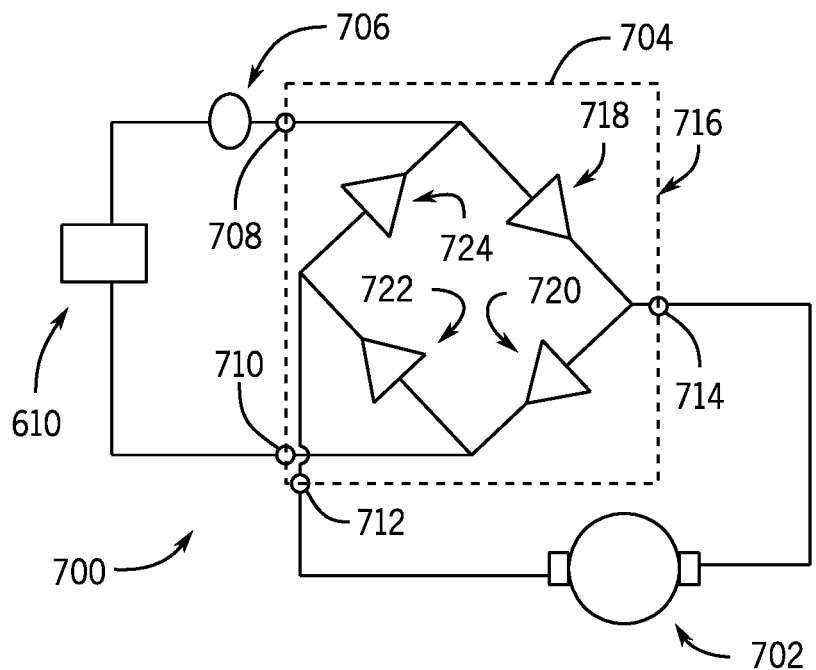
FIG. 7 is a schematic illustration of portions of the food waste disposer of FIG. 6.

Referring still to FIG. 6, and additionally to FIG. 7, which provides a schematic illustration 700 of the food waste disposer 600, the LEF 604 includes an appliance inlet power cord connection structure (or modified appliance inlet structure) 610, which can be or include a modified C14 type appliance inlet (or alternatively have another design). In the present embodiment, the appliance inlet power cord connection structure 610 can take the form of a receptacle having an opening 612 along the bottom surface 608 of the LEF 604. The inlet power cord connection structure 610 may also include an outer rim 614 that may be raised with respect to the bottom surface 608 of the LEF 604. The outer rim 614 is secured to the housing 616, and in this example specifically to the bottom surface 608. The power cord connection structure 610 can be configured to receive a plug, such as a modified C13 type plug, or alternatively another type of plug having another design, and can be configured to allow for electrical power to be communicated from that plug to electrical coupling prongs (not shown) extending within the receptacle. It should be appreciated from FIG. 6 that, in contrast to the conventional food waste disposer 100 of FIG. 1 that has the terminal cover 108 by which an interior space within that waste disposer can be accessed, the food waste disposer 600 with the appliance inlet power cord connection structure 610 has no removable terminal cover by which an installer can gain access to the interior of the food waste disposer 600 (or to its internal motor compartment) to achieve coupling of the food waste disposer to an electrical power source.

Further with respect to FIG. 7, it should also be appreciated that the appliance inlet power cord connection structure 610 in the present embodiment is coupled electrically to a PM motor 702 (which can be situated within the PM motor compartment 602 of FIG. 6) by way of an AC-to-DC converter 704 and a motor overload switch 706. The appliance inlet power cord connection structure 610 and motor overload switch 706 are electrically coupled in series with one another between a first AC input port 708 and a second AC input port 710 of the AC-to-DC converter 704, and the PM motor 702 is electrically coupled between a first DC output port 712 and a second DC output port 714 of the AC-to-DC converter.

In the present embodiment, the AC-to-DC converter 704 takes the form of a full wave rectifier 716 albeit, in other embodiments, the AC-to-DC converter can take other forms. As shown, in the present embodiment employing the full wave rectifier 716, the full wave rectifier includes first, second, third, and fourth diodes 718, 720, 722, and 724. As shown, the anode and cathode of the first diode 718 are respectively coupled to the first AC input port 708 and the second DC output port 714, respectively, the anode and cathode of the second diode 720 are respectively coupled to the second AC input port 710 and the second DC output port, respectively, the anode and cathode of the third diode 722 are respectively coupled to the first DC output port 712 and the second AC input port 710, respectively, and the anode and cathode of the fourth diode 724 are respectively coupled to the first DC output port 712 and the first AC input port 708, respectively. In contrast to food waste disposers employing induction motors, which can employ start switch modules, the present embodiment of the food waste disposer 600 has no start switch module (or start switch) because it employs the PM motor 702.

Turning to FIGS. 8-11, the food waste disposer 600 can include, or can be installed in conjunction with, one or more system components that permit the food waste disposer to achieve either corded installation or hardwired installation depending upon whether the environment (e.g., home kitchen) within which the food waste disposer is being installed includes an electrical wall outlet or a Romex/BX cable. As will be described in further detail below, these system components can be considered to be alternative system components, in that one or more of the system component(s) can be implemented to achieve corded installation and one or more other(s) of the system component(s) can be implemented to achieve hardwired installation.

Figure 8:
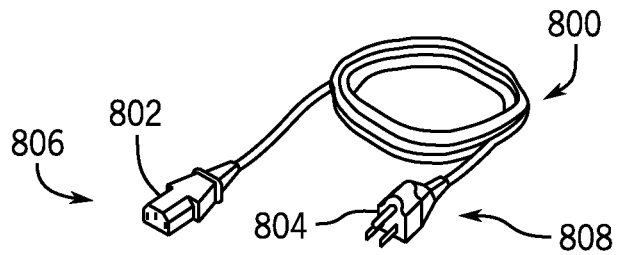
FIG. 8 illustrates a power cord that can be selectively employed in or as part of (or in conjunction with) the food waste disposer of FIGS. 6 and 7 so as to achieve installation of the food waste disposer with power provided from a wall outlet.

More particularly, FIG. 8 shows a power cord 800 that particularly allows for corded installation in an environment in which there is an electrical wall outlet. As shown, the power cord 800 includes a first plug 802 that is a modified C13 type plug, but can alternatively be any other suitable type of plug at a first end 806 of the cord. The power cord 800 also includes a second plug 804, which is shown as being a NEMA 5-15 plug, but could alternatively be any other suitable type of plug for forming an electrical connection with a wall outlet, at a second (e.g., opposite) end 808 of the power cord. Corded installation of the food waste disposer 600 can be achieved using the power cord 800 simply by plugging the first plug 802 into the appliance inlet power cord connection structure 610, and by plugging the second plug 804 into the electrical wall outlet (not shown) provided at the installation location.

Figure 9:
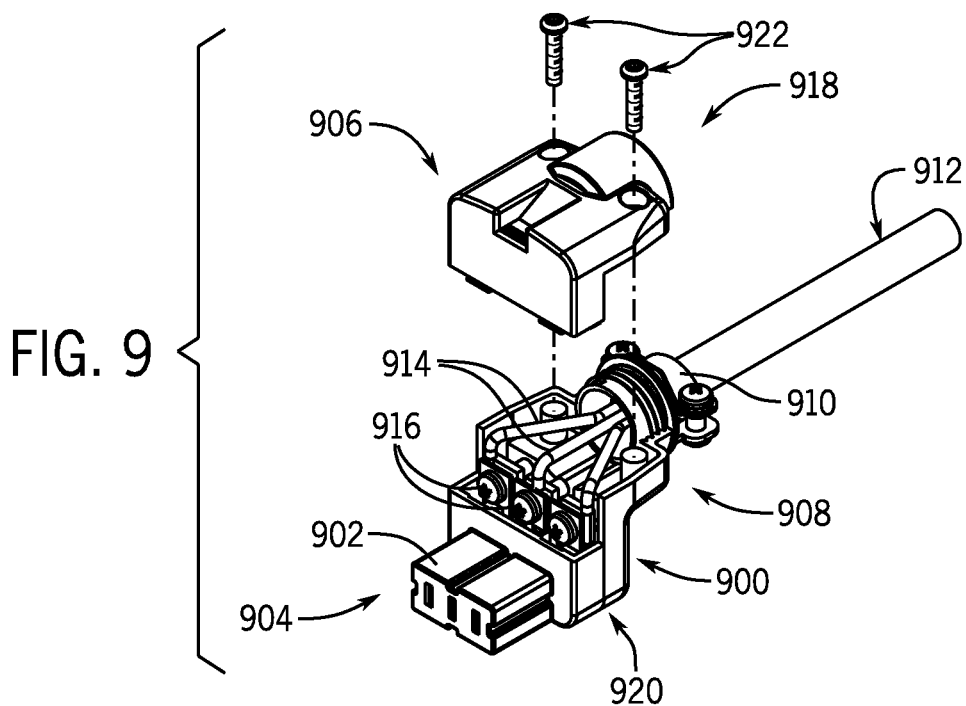
FIG. 9 is a partly-exploded view of a first Romex/BX adapter assembly with custom plug, which can be employed so as to achieve installation of food waste disposers of the example embodiments described herein in a home having/providing the Romex/BX cable.
Figure 10:
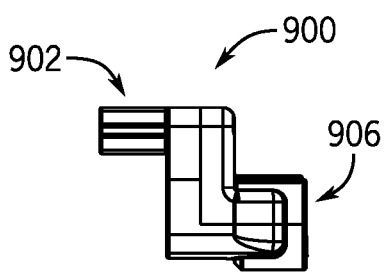
FIG. 10 is a side elevational view of the adapter of FIG. 9.
Figure 11:
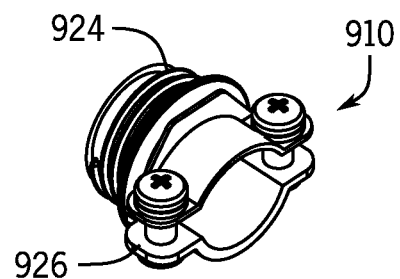
FIG. 11 is a perspective view of a Romex/BX coupler that can be used with, or as a component of, the adapter of FIG. 9.

By comparison, FIGS. 9 and 10 show a Romex/BX adapter (or simply Romex adapter) 900, which includes both a first plug 902, shown as being a modified C13 type plug, on a first side (or end) 904 of the adapter 900 and a Romex/BX coupling assembly 906 on a second side (or end) 908 of the adapter 900. The first plug 902 and the Romex/BX coupling assembly 906 are each generally oriented extending or facing outward from the Romex adapter 900 in opposite directions that are parallel or substantially parallel to another. A Romex/BX (or simply Romex) coupler 910, shown in FIGS. 9 and 11, can also be provided. The Romex coupler 910 can include a connection end 924, which may be threaded, and an adjustable clamp 926 configured to receive and be tightened around an end of the Romex/BX cable 912. The Romex coupler 910 in the present embodiment can take the form of a commonly available electrical component typically used to ground metallic sheathed cable (BX) and/or secure the Romex/BX cable to another component (e.g., to an electrical outlet box or an adapter).

As further illustrated by FIG. 9, in an installation environment in which a Romex/BX cable 912 is present, an installer can pass an end of the Romex/BX cable through the Romex coupler 910 and attach lead wires 914 extending from an end of that Romex/BX cable 912 to screws 916 of the Romex/BX coupling assembly 906 or, in an alternative embodiment, attach the lead wires 914 extending from the end of that Romex/BX cable 912 to insulation displacement type terminals (not shown) of the Romex/BX coupling assembly (insulation displacement terminals may be appropriate for example for circumstances in which screws are not needed for electrical contact). Additionally, as should be evident from FIG. 9, which provides a partly-exploded view of the Romex/BX coupling assembly 906 in which a cover portion 918 is exploded from a remainder portion 920 of that coupling assembly, the Romex coupler 910 can be attached to/retained in relation to the Romex/BX coupling assembly 906 when the cover portion 918 is assembled to the remainder portion 920 (e.g., by way of screws 922 or alternatively some other retention mechanism or method such as involving snaps). When the Romex/BX cable 912 is fully assembled to the Romex adapter 900, electrical installation of the food waste disposer 600 can be achieved simply by plugging the first plug 902, such as the illustrated modified C13 type (or alternatively some other type of) of the Romex adapter 900 into the appliance inlet power cord connection structure 610.

Figure 12:
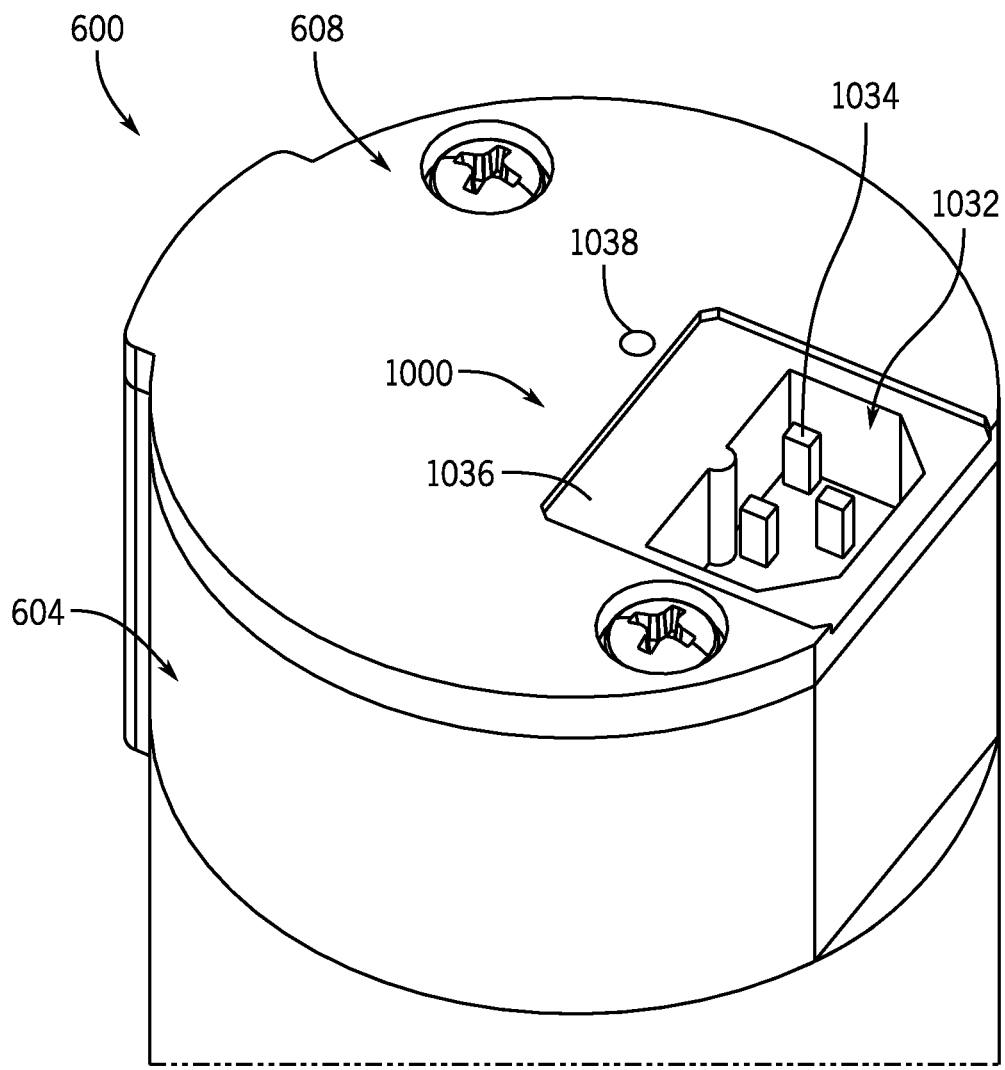
FIG. 12 is a bottom perspective cutaway view of portions of a second example food waste disposer having a permanent magnet motor that, in accordance with a second example embodiment encompassed herein, can be installed in a home so as to receive electric power, in either of two alternative manners depending upon whether the home includes a Romex/BX cable or a wall outlet.

FIG. 12 shows a second embodiment of the bottom of a food waste disposer 600 in a manner illustrative of how it would be received by the customer, and particularly shows a bottom perspective view of a LEF 604 of the food waste disposer 600, including a bottom surface 608 thereof. An appliance inlet power cord connection structure 1000 is located on the bottom surface 608 of the LEF 604. The appliance inlet power cord connection structure 1000 can be or include a modified C14 type appliance inlet (or alternatively have another design). The appliance inlet power cord connection structure 1000 can include a receptacle having an opening 1032 configured to receive a plug, such as a modified C13 type plug, or alternatively another type of plug having another design. The appliance inlet power cord connection structure 1000 can also include electrical coupling prongs 1034 extending within the receptacle, and can be configured to allow for electrical power to be communicated from the received plug to the electrical coupling prongs 1034. Instead of a raised outer rim, such as the outer rim 614 shown in FIG. 6, the appliance inlet power cord connection structure 1000 may include a recessed outer portion 1036 that surrounds the opening 1022. The recessed outer portion may be configured to receive an adapter cover plate, such as adapter cover plate 1014 shown in FIG. 13, discussed below. The bottom surface 608 of the LEF 604 may further include a screw hole 1038, which can be configured to receive a screw to secure the adapter cover plate to the bottom surface 608.

Figure 13B:
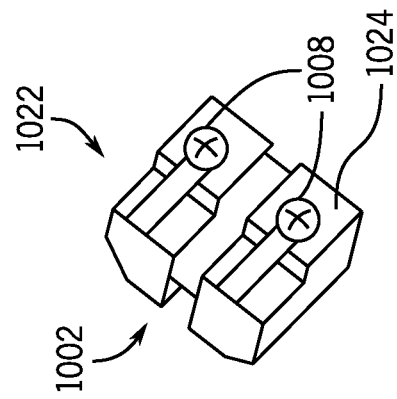
FIG. 13B is a front perspective view of the adapter of FIG. 13A.
Figure 13A:
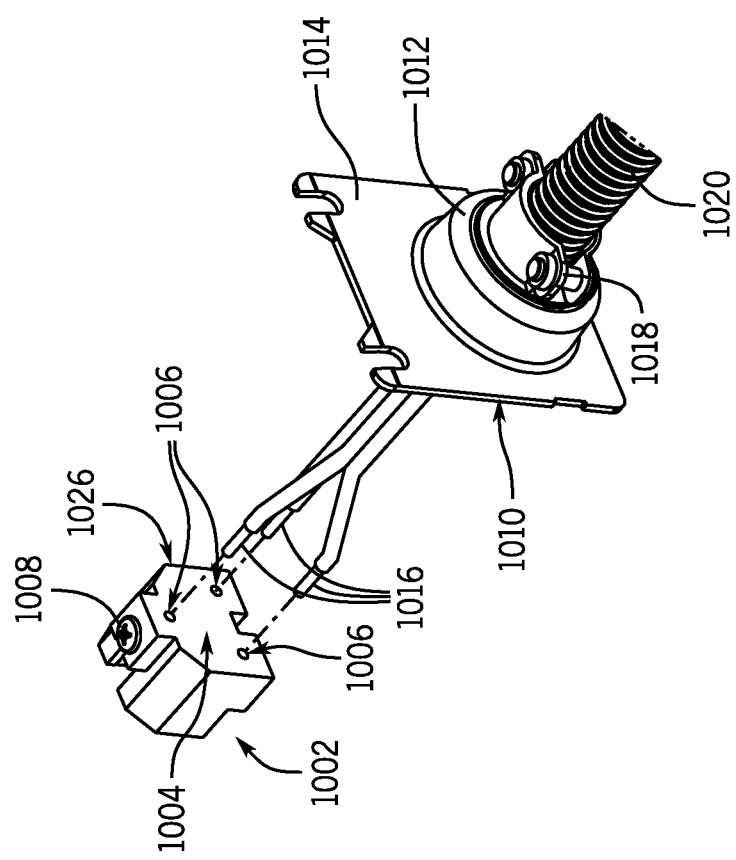
FIG. 13A is a partly-exploded view of an assembly of a Romex/BX cable and system components which can be employed so as to achieve installation of the food waste disposers of the example embodiments described herein in a home having/providing the Romex/BX cable.
Figure 14:
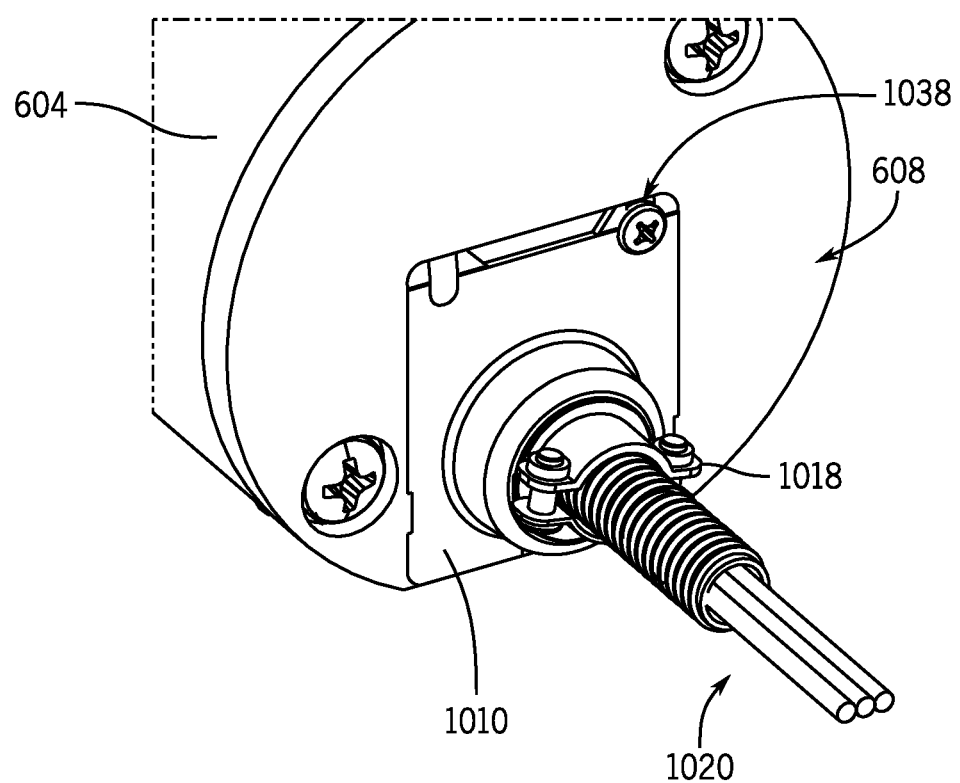
FIG. 14 is a bottom perspective cutaway view of the food waste disposer of FIG. 12 when the Romex/BX cable and system components of FIG. 13 are installed so as to allow for electrical power to be provided to the disposer via the Romex/BX cable.

FIGS. 13A, 13B, and 14 illustrate a second example embodiment of a Romex/BX adapter 1002 and additional system components that can be used for installation of food waste disposer 600 in an installation environment in which a Romex/BX cable 1020 is present. FIG. 13A provides an exploded view of a subassembly of the system components, including Romex/BX adapter 1002, in relation to the Romex/BX cable 1020 prior to coupling of the subassembly to an appliance inlet module, such as the appliance inlet power cord connection structure 1000 of the food waste disposer 600. FIG. 13B shows a front perspective view of the Romex/BX adapter 1002. FIG. 14 shows the Romex/BX adapter 1002 and additional system components of FIGS. 13A and 13B after they have been installed in relation to the appliance inlet power cord connection structure 1000 of the food waste disposer 600.

The Romex/BX adapter 1002 and additional system components as shown in FIGS. 13A, 13B, and 14 include the Romex/BX adapter 1002, an adapter cover 1010, a Romex/BX coupler 1018 and a Romex/BX cable 1020 having lead wires 1016. The Romex/BX adapter 1002 includes a first plug 1022 on a first side (or end) 1024 of the Romex/BX adapter 1002, and a Romex/BX coupling assembly 1004 on a second side (or end) 1026 of the Romex/BX adapter 1002. The Romex/BX coupling assembly 1004 includes holes 1006 within the Romex/BX coupling assembly 1004 of the Romex/BX adapter 1000 and a plurality of fasteners 1008, such as screws configured to retain lead wires 1016 of the Romex/BX cable 1020. The Romex/BX coupler 1018 can be of the same or similar type as Romex/BX coupler 910 shown in FIG. 11. The adapter cover 1010 can include an adapter cover plate 1014 and a collar 1012. The adapter cover 1010 is configured to receive an end of the Romex/BX cable 1020 such that the end of the Romex/BX cable 1020 extends trough the collar 1012 and the adapter cover plate 1014. The adapter cover plate 1014 can be configured to receive one or more fasteners, such as screw 1028, for securing the adapter cover 1010 to the bottom surface 608 of LEF 604.

A primary difference between the Romex/BX adapter 1002 and the Romex/BX adapter 900 is that the Romex/BX adapter 1002 is smaller in size than Romex/BX adapter 900. The Romex/BX adapter 1002 is sufficiently small that, when the Romex adapter 1002 is inserted into the appliance inlet power cord connection structure 610 or 1000, it is positioned sufficiently deeply that the adapter cover 1010 can be positioned directly onto the outer rim 614 or the recessed outer portion 1006, laying flat, and can be secured to the outer rim 614 or the bottom surface 608 of the LEF 604. However, like Romex/BX adapter 900, the first plug 1022 and the Romex/BX coupling assembly 1004 are each generally oriented extending or facing outward from the Romex adapter 1002 in opposite directions that are parallel or substantially parallel to another.

Figure 15:
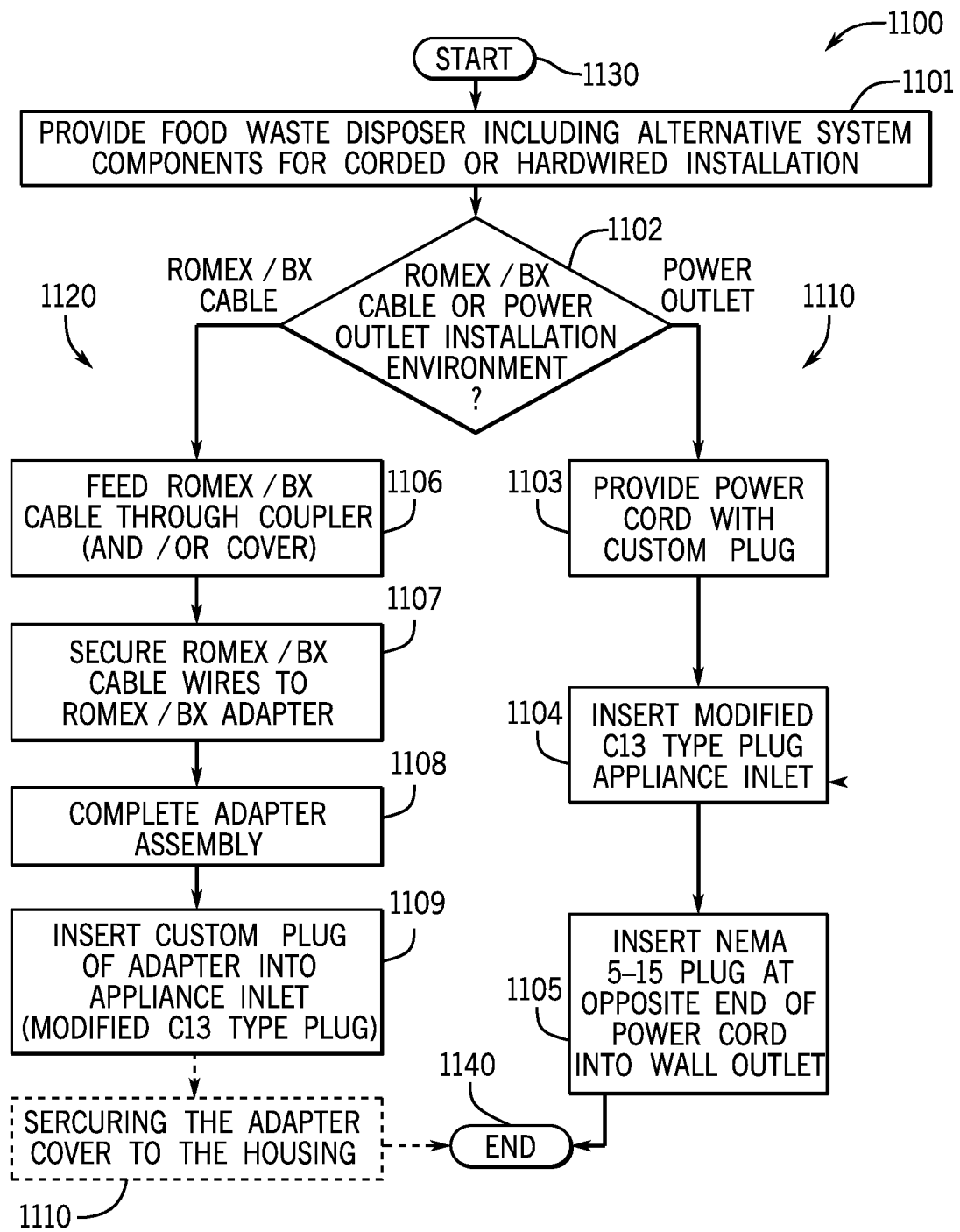
FIG. 15 is a flow chart showing example steps of an installation process by which a food waste disposer and associated system components described in relation to the example embodiments described herein can be installed in either of the two alternative manners depending upon whether the home includes a Romex/BX cable or a wall outlet.

Turning to FIG. 15, a flow chart illustrates in one example of a method 1100 of installing the food waste disposer 600 or 1200 in an environment such as for example in a kitchen in a home (e.g., beneath a kitchen sink), where the performing of the method takes into account, and varies depending upon, whether the environment includes a Romex/BX cable such as the Romex/BX cable 912, 1020, or 1400, or includes an electric wall outlet. That is, the method 1100 is one in which the steps of the method that are performed vary depending upon whether the installation environment is suited for corded installation or hardwired installation. It should be appreciated that the method 1100 of FIG. 15 particularly relates to the installation of the food waste disposer 600 or 1200 in terms of its being coupled to receive electric power, and not to other aspects of installation such as how the food waste disposer is physically mounted or supported in relation to a structure such as a sink, although it will be appreciated that installation of a food waste disposer will also typically include such other aspects. Further, it will be appreciated that, in many installation circumstances, it will be appropriate or advantageous to perform the electrical installation of the food waste disposer after the physical/mechanical installation of the food waste disposer has already been achieved, such that the food waste disposer is physically fixed in place relative to the surrounding environment.

More particularly as shown in FIG. 15, upon the method of installation commencing at a start step 1130, the food waste disposer 600 or 1200 is provided to the installation environment including at least the relevant alternative system components that can be utilized to achieve corded or hardwired installation of the disposer, at a step 1101. It is then determined, at a step 1102, whether the installation environment is one that includes an electric wall power outlet, such that corded installation is appropriate, or includes a Romex/BX cable such that hardwired installation is appropriate. If it is determined that an electrical wall power outlet is present, then (after the food waste disposer 600 or 1200 is installed to a sink) the food waste disposer 600 or 1200 is connected to a power source using the provided power cord, such as power cord 800 or 1300, by proceeding along a first branch of steps 1110 subsequent to the step 1102. More particularly, this entails performing of a step 1103, at which the power cord 800 with the first plug (e.g., the modified C13 type plug 802 or in alternate embodiments another type of plug), or the power cord 1300 with first plug 1302, is provided. At step 1104, the first plug 802 or 1302 is connected to the appliance inlet power cord connection structure 610 or 1210 of the food waste disposer 600 or 1200, respectively, and a step 1105 at which the second plug 808 or 1304, such as a NEMA 5-15 plug, is connected to the wall outlet. The method then ends, as represented by an end step 1140.

Alternatively, if it is determined that a Romex/BX cable, such as the Romex/BX cable 912, 1020 or 1400, is present and thus that hardwired installation is appropriate, then (after the food waste disposer 600 or 1200 is installed to a sink) the installer will attach the food waste disposer to that cable by proceeding along a second branch of steps 1120 subsequent to the step 1102. More particularly as shown, to achieve coupling of the food waste disposer 600 or 1200 to the Romex/BX cable 912, 1020, or 1400, the installer at a step 1106 feeds the Romex/BX cable 912, 1020, or 1400 through the Romex coupler 910 or 1018. The installer may also feed the Romex/BX cable 912 or 1020 through the adapter cover 1010 when one is being used. Additionally, the installer at a step 1107 then attaches the Romex/BX cable 912, 1020, or 1400 to the Romex adapter 900, 1002, or 1308, particularly by connecting the individual lead wires 914 or 1016 to the screws (or other terminals, such as insulation displacement terminals) 916, 1008 or 1404 on the Romex adapter 900, 1002, or 1308. Further, at a step 1108, the installer completes the adapter assembly. The step 1108 of completing the adapter assembly may include positioning the Romex coupler 910 or 1306 onto the second end 908 or 1316 of the Romex adapter 900 or 1308 and attaching the cover portion 918 or 1406 to the remainder portion 920 or 1408 (such as by way of the screws 922 or 1410). Alternatively, in examples using an adapter cover 1010, the step 1108 of completing the adapter assembly may include the installer securing the Romex/BX coupler 1018 to the collar 1012 of the adapter cover 1010. Next, at a step 1109, the installer inserts the first plug 902, 1022 or 1310 of the Romex adapter 900, 1002, or 1308 into the appliance inlet power cord connection structure 610, 1000 or 1210. Examples using an adapter cover 1010 may include an additional step 1110 of securing the adapter cover 1010 to the housing 616 or 1214, such as by using one or more screws to secure the adapter cover the outer rim 614 or 1216 of the inlet power cord connection structure 610 or 1210, the bottom surface 608 or side wall 1206. The method then ends, again as represented by the end step 1140.

It should be appreciated that, in general, overall attachment of a Romex adapter, Romex coupler, and Romex/BX cable with one another in accordance with the example embodiments described herein can be achieved as a result of the performing of the steps 1106, 1107, and 1108. Nevertheless, notwithstanding the present description, it should also be appreciated that in alternate embodiments the aforementioned steps, or portions of these steps, can be performed in different orders, and/or one or more alternate steps (or substeps) can be performed in addition to, or instead of, the aforementioned steps or portions of the aforementioned steps. For example, in one example of an alternate embodiment, the Romex coupler can be positioned onto the remainder portion of the Romex adapter prior to the connecting of the lead wires to the screws.

Additionally, although in the method 1100 the step 1102 at which the installation environment is determined occurs subsequent to the step 1101 at which the food waste disposer including alternative system components is provided, an installer need not make a determination of the type of installation environment at a time when the installer is physically present at the installation environment, or at a time after which the installer has already brought the food waste disposer and all of the alternative system components suited for corded and hardwired installation to an installation site. It is also possible that, in some cases, an installer will be apprised of whether an installation environment will be suited for corded or hardwired installation prior to the installer being physically at that site and, in some such cases, it may be possible that the installer will only bring to the installation site certain one(s) of the alternative system components that are suited for that environment. For example, if an installer knows that a particular home has a wall outlet beneath the sink, the installer may bring the power cord 800 or 1300 to that home but not any of the Romex couplers or Romex adapters. Alternatively for example, if an installer knows that a particular home has a Romex/BX cable, the installer may bring one or more of the Romex couplers and Romex adapters but not the power cord 800 or 1300.

Depending upon the circumstance or embodiment, the food waste disposer 600 or 1200 can be understood as including all of the alternative system components suited for each of corded and hardwired installation, such as (in the present example embodiment) all of: a power cord 800 or 1300; a Romex coupler 910 or 1018; one or more of Romex adapters 900, 1002 and 1310; and an adapter cover 1010. Alternatively, however, the food waste disposer 600 or 1200 also can be understood as including a subset of those alternative system components (e.g., only the Romex coupler 910 and Romex adapter 900, or only the power cord 800 or 1300). For example, the food waste disposer 600 or 1200 can be understood as including only those of the alternative system components that are actually necessary to be implemented at the installation site. Further alternatively, the food waste disposer 600 or 1200 can be understood as not including any of those alternative system components that are not necessary to be implemented depending upon whether the installation site is suitable for corded installation or hardwired installation. For example, the food waste disposer 600 or 1200 can be understood as including the structures shown in FIG. 6 and FIG. 7 but not any of the structures shown in FIG. 8 and FIG. 9-10, and the structures shown in FIG. 8 and FIG. 9-10 can be considered distinct and separate from, or optional components of the food waste disposer itself.

It should be recognized that the food waste disposer and associated alternative system components described with respect to the example embodiments discussed herein and the method 1100 of installation shown in FIG. 15, can provide one or more advantages relative to conventional food waste disposer arrangements. For example, because this food waste disposer arrangement is equally suitable for corded and hardwired installation, there is no need to manufacture two distinct food waste disposer products that are respectively suited for corded installation or hardwired installation. That is, there is no difference between uncorded or pre-corded disposers during manufacture, and the installer can use the provided power cord 800 or 1300 or any of the Romex adapters 900, 1002 or 1310 as appropriate for any particular installation site. Also, in the example embodiments, all wiring related to connecting the food waste disposer 600 or 1200 to a power source is positioned externally of the main body of the food waste disposer (e.g., external to the LEF 604 or 1204, the side wall 606 or 1206 and the bottom circular 608, or external to the entire food waste disposer 600 or 1200 if the food waste disposer is understood as not including any of the alternative system components), and this can reduce the likelihood of installation errors. Further, the detachable power cord 800 or 1300 does not need to be assembled to (or as part of) the food waste disposer prior to packaging and can be better positioned in the carton to prevent damage during shipping.

Figure 16:
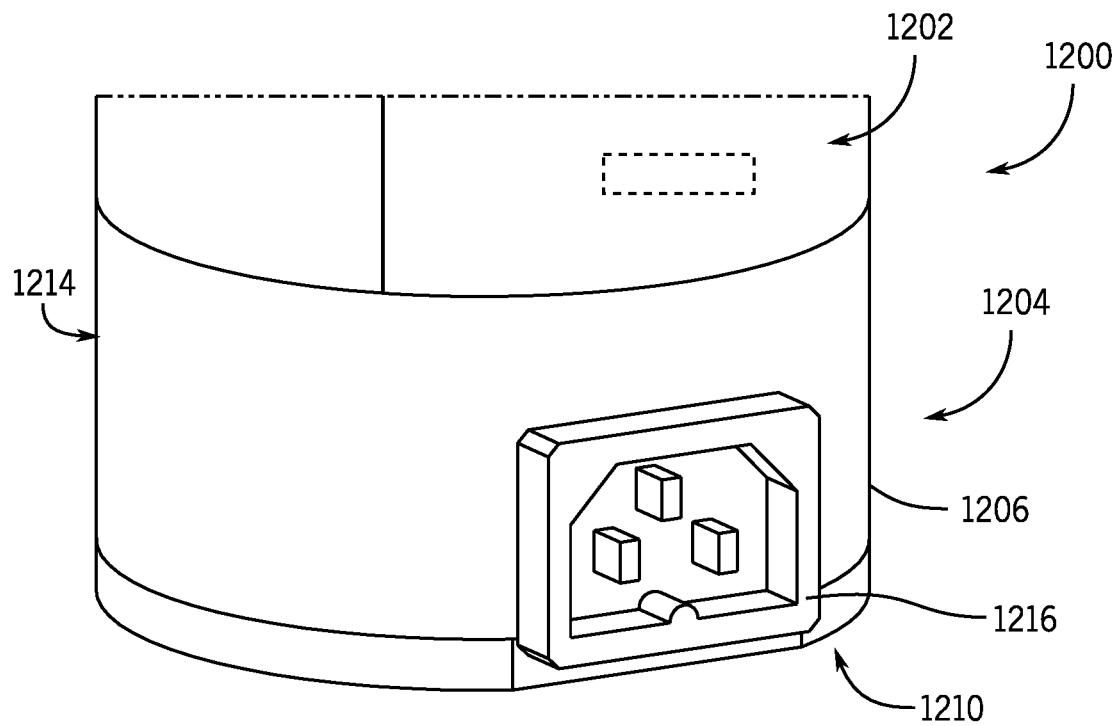
FIG. 16 is a side perspective cutaway view of portions of a third example food waste disposer that, in accordance with a third example embodiment encompassed herein, can be installed in a home so as to receive electric power, in either of two alternative manners depending upon whether the home includes a Romex/BX cable or a wall outlet.

Turning next to FIGS. 16-20, features of a third example embodiment of a food waste disposer 1200 are shown, where again the food waste disposer can be installed in a home or other installation site so as to receive electric power in either of two alternative manners depending upon whether the installation site includes a Romex/BX cable or a wall outlet. FIG. 16 shows a side perspective cutaway view of portions of the food waste disposer 1200. As with the food waste disposer 600, the food waste disposer 1200 includes the permanent magnet (PM) motor 702 (see FIG. 7) that, in this embodiment, is situated (or supported or housed) within a PM motor compartment 1202. In FIG. 16 (as was the case in FIG. 6), the PM motor compartment 1202 is represented by dashed lines—it should be appreciated that the dashed lines only show the PM motor compartment 1202 in a figurative manner and that the actual compartment need not have the particular rectangular size and shape shown by the dashed lines.

FIG. 16 further shows a LEF (or motor LEF) 1204 of the food waste disposer 1200. Also, in the present embodiment, the bottom of the food waste disposer 1200, and the LEF 1204 thereof, is cylindrical in shape and particularly includes a housing 1214 having a side wall 1206 that is bounded at its bottom end by a bottom circular (or substantially-circular) surface (not shown). It should be understood that, although not shown in FIG. 16, the food waste disposer 1200 additionally includes an enclosure that is located above the portions particularly shown in FIG. 16 (e.g., above the portion of the side wall 1206 that is shown), and includes each of a food conveying section, a motor section, and a grinding section as described above with reference to the food waste disposer 100 of FIG. 1.

Referring still to FIG. 16, it should be appreciated that the food waste disposer 1200 also includes the appliance inlet power cord connection structure 1210 (which may be identical or similar to the appliance inlet power cord connection structure 610 of food waste disposer 600). However, the positioning of the appliance inlet power cord connection structure 1210 in the food waste disposer 1200 differs from the positioning of the appliance inlet power cord connection structure 610 in the food waste disposer 600. As already discussed, in the food waste disposer 600, the appliance inlet power cord connection structure 610 is positioned along the bottom circular surface 608. In contrast, in the food waste disposer 1200, the appliance inlet power cord connection structure 1210 is positioned along the side wall 1206. Thus, the appliance inlet power cord connection structure 610 is bottom-accessible in the case of the food waste disposer 600, and the appliance inlet power cord connection structure 1210 is side-accessible in the case of the food waste disposer 1200.

In terms of its electrical operation, the food waste disposer 1200 can be considered to be identical or substantially-identical to the food waste disposer 600. More particularly, the schematic illustration 700 of FIG. 7 is an electrical schematic that is representative not only of the food waste disposer 600 but also of the food waste disposer 1200. Thus, again as illustrated by FIG. 7, the food waste disposer 1200 can be understood to include particularly the appliance inlet power cord connection structure 1210 coupled in the same way as appliance inlet power cord connection structure 610 to the PM motor 702. Specifically, coupled by way of the AC-to-DC converter 704 and the motor overload switch 706 as described above. Again, the AC-to-DC converter 704 can take the form of the full wave rectifier 716 shown in FIG. 7, or can take other forms.

Figure 17:
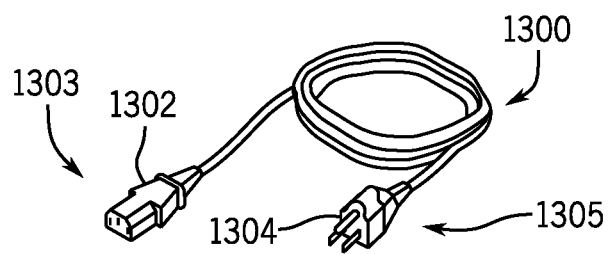
FIG. 17 illustrates a power cord that can be selectively employed in or as part of (or in conjunction with) the food waste disposer of FIG. 16 so as to achieve installation of the food waste disposer with power provided from a wall outlet.
Figure 18:
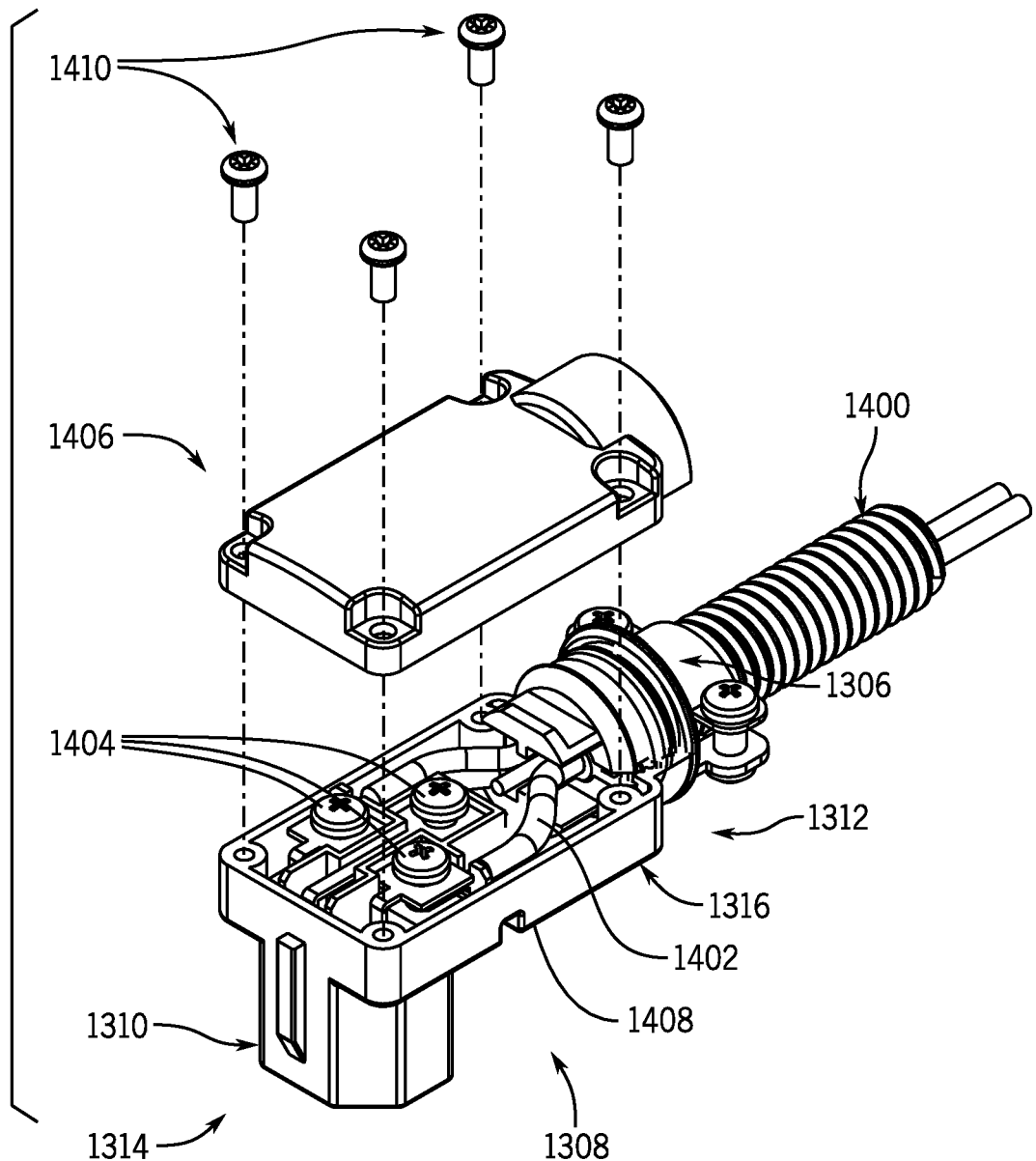
FIG. 18 is a partly-exploded view of a second Romex/BX adapter assembly with custom plug, which can be employed so as to achieve installation of food waste disposers of the example embodiments described herein in a home having/providing the Romex/BX cable.
Figure 19:
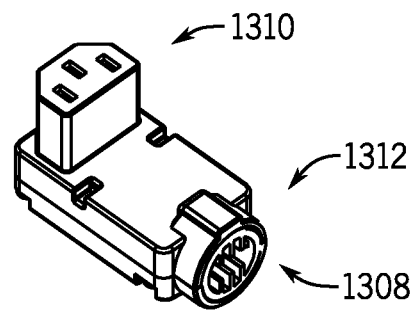
FIG. 19 is a perspective view of the adapter of FIG. 9.

Additionally, the system components shown in FIGS. 13A, 13B, and 17-19 can be used in conjunction with the food waste disposer 1200, so as to permit the food waste disposer to achieve either corded installation or hardwired installation depending upon whether the installation environment (e.g., home kitchen) within which the food waste disposer is being installed includes an electrical wall outlet or a Romex/BX cable. FIG. 17 particularly shows a power cord 1300 that allows for corded installation in an environment in which there is an electrical wall outlet, and that includes a first plug 1302, such as a modified C13 type plug (or, in alternate embodiments, another type of plug) at a first end 1303 of the cord and a second plug 1304, such as a NEMA 5-15 plug, at a second (e.g., opposite) end 1305 of the cord 1300. By comparison, FIGS. 18 and 19 show a Romex/BX (or simply Romex) adapter 1308, which includes a first plug 1310, such as a modified C13 type plug, on a first side (or end) 1314 of the adapter 1308 and a Romex/BX coupling assembly 1312 on a second side (or end) 1316 of the adapter.

Additionally, as further illustrated by FIGS. 18 and 19, in an installation environment in which a Romex/BX cable 1400 is present, an installer can pass an end of the Romex/BX cable 1400 through the Romex coupler 1306 and attach lead wires 1402 extending from an end of that Romex/BX cable 1400 to screws 1404 of the Romex/BX coupling assembly 1312. As should be evident from FIG. 18, which provides a partly-exploded view of the Romex/BX coupling assembly 1312 in which a cover portion 1406 is exploded from a remainder portion 1408 of that coupling assembly, the Romex coupler 1306 can be attached to/retained in relation to the Romex/BX coupling assembly 1312 when the cover portion 1406 is assembled to the remainder portion 1408 (e.g., by way of screws 1410, or alternatively other terminals such as insulation displacement terminals).

In view of this difference between the food waste disposer 1200 and food waste disposer 600, there is an additional corresponding difference between the shape of the Romex adapter 1308 relative to the shape of the Romex adapter 900. In particular, as is evident from FIGS. 18 and 19, the first plug 1310, shown as being a modified C13 type plug, of the Romex adapter 1308 extends or faces outward from the Romex adapter 1308 in a first direction that is perpendicular to, or substantially perpendicular to, a second direction in which the Romex/BX coupling assembly 1312 faces or extends outward from the Romex adapter 1308 (that is, the two portions of the Romex adapter extend at right angles relative to one another). This is in contrast to the first plug 902 and Romex/BX coupling assembly 906 of the Romex adapter 900, or the first plug 1022 and Romex/BX coupling assembly 1004 of Romex adapter 1002, which generally face or extend outward from their respective Romex adapters in opposite directions that are parallel or substantially parallel to another. This difference between the Romex adapters 900 and 1002 and Romex adapter 1308 exists primarily to permit installation of the food waste disposer 1200 in a manner that accommodates a Romex/BX cable (such as the Romex/BX cable 1400) that approaches the food waste disposer from a location generally beneath the food waste disposer.

Figure 20:
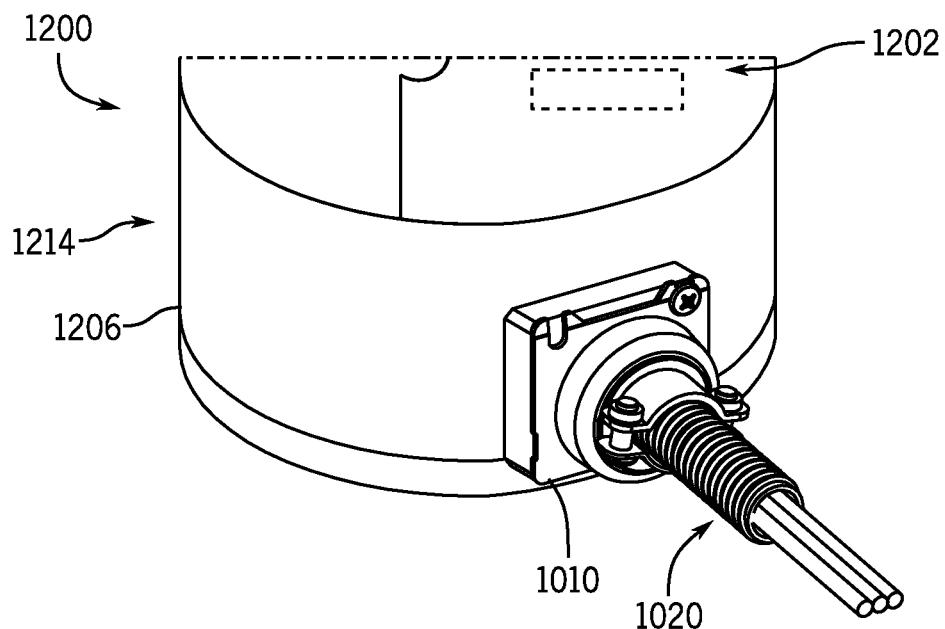
FIG. 20 is a bottom perspective cutaway view of the food waste disposer of FIG. 16 when the Romex/BX cable and system components of FIG. 13 are installed so as to allow for electrical power to be provided to the disposer via the Romex/BX cable.

Referring to FIGS. 16 and 20, the food waste disposer 1200, like food waste disposer 600, can be installed using the system components described with reference to FIGS. 13A and 13B in an installation environment in which a Romex/BX cable 1020 is present. FIG. 20 illustrates the Romex/BX adapter 1002 and additional system components of FIGS. 13A and 13B after they have been installed in relation to the appliance inlet power cord connection structure 1210 of the food waste disposer 1200. As shown in FIG. 16, the appliance inlet power cord connection structure 1210 may include an outer rim 1216. Alternatively, the appliance inlet power cord connection structure 1210 may include a recessed outer portion in side wall 1206 that is similar or identical to the recessed outer portion 1006 of the appliance inlet power cord connection structure 1000. The adapter cover 1010 can be secured to the housing 1214 in any suitable manner, such as being secured by one or more screws to the outer rim 1216 or alternatively to the side wall 1206.

It should be appreciated that the food waste disposer 1200 and associated system components can be either identical to (e.g., in the case of the power cord 1300 relative to the power cord 800) or similar to the food waste disposer 600 and associated system components thereof and, in particular, there is a one-to-one correspondence between the respective components of the food waste disposer 1200 and the respective components of the food waste disposer 600. The food waste disposer 1200 primarily differs from the food waste disposer 600 in that (as already mentioned), the appliance inlet power cord connection structure 610 in the embodiment of FIG. 6 is positioned along the bottom circular surface 608 of the food waste disposer 600, while the appliance inlet power cord connection structure 1210 in the embodiment of FIG. 16 is positioned along the side wall 1206 of the food waste disposer 1200.

Notwithstanding the above-described differences between the food waste disposer 1200 and associated system components and the food waste disposer 600 and associated system components, nevertheless it should be appreciated that the food waste disposer 1200 can be installed in a manner that is identical or substantially similar to that shown by the method 1100 of FIG. 15. Again, depending upon whether the installation environment in which the food waste disposer 1200 is being installed includes a wall outlet or a Romex/BX cable, respectively, either the first branch of steps 1110 or the second branch of steps 1120 is performed.

Further, notwithstanding the above description, the present disclosure is intended to encompass additional embodiments and modified versions of the above-described embodiments in addition to the embodiments specifically described above. Among other things, although the above description relates to food waste disposers, the present disclosure is also intended to encompass embodiments relating to other types of waste disposers. Also for example, although the above description shows embodiments having particular structures, mechanisms, or assemblies that allow for two or more components to be coupled with, connected to, or assembled with one another, the present disclosure is also intended to encompass other structures, mechanisms, or assemblies that allow for components to be coupled with, connected to, or assembled with one another.

Additionally for example in this regard, even though the present disclosure envisions embodiments employing modified C13 plugs and appliance inlet power cord connection structures taking complementary forms suitable for receiving those modified C13 plugs (e.g., having the modified C14 type appliance inlets), these plugs and complementary connection structures are only exemplary in nature, and the present disclosure is intended to encompass many other, different designs of plugs and/or receptacles, inlets, or other connection structures. Also for example in this regard, even though the present disclosure envisions embodiments employing Romex adapters (such as the Romex adapters 900, 1002 and 1308) having coupling assemblies (e.g., the coupling assemblies 906, 1104 and 1312) with screws that allow for the attachment of Romex/BX cables to the respective adapters, the present disclosure is also intended to encompass other adapters and/or coupling assemblies with other mechanisms allowing for the attachment of power cables such as Romex/BX cables to the adapters and/or coupling assemblies including, for example, insulation displacement type terminals.

Also, notwithstanding the description above concerning how the Romex adapter 1308 can be employed in conjunction with the food waste disposer 1200 in relation to a Romex/BX cable, or how the Romex adapter 900 can be employed in conjunction with the food waste disposer 600 in relation to a Romex/BX cable, in alternate embodiments the Romex adapter 900 can be employed in conjunction with the food waste disposer 1200 in relation to a Romex/BX cable, or the Romex adapter 1308 can be employed in conjunction with the food waste disposer 600 in relation to a Romex/BX cable. Such alternate embodiments can be appropriate, for example, in an environment in which the Romex/BX cable approaches the food waste disposer from a location generally to the side of the food waste disposer rather than form a location generally beneath the food waste disposer.

It is specifically intended that the present invention not be limited to the embodiments and illustrations contained herein, but include modified forms of those embodiments including portions of the embodiments and combinations of elements of different embodiments as come within the scope of the following claims.

We claim:

1. A food waste disposer system comprising:
   a permanent magnet (PM) motor;
   an AC-to-DC converter having an AC input port and a DC output port, wherein the DC output port is coupled at least indirectly to the PM motor;
   a housing including a first side portion and a bottom portion;
   a power cord connection structure supported at least indirectly upon the housing, wherein the power cord connection structure is coupled at least indirectly to the AC input port;
   an adapter; and
   a power cord including a first end with a first plug configured to be coupled to the power cord connection structure and a second end with a second plug configured to be coupled to the wall outlet;
   wherein the food waste disposer system is configured to be selectively implemented either in a first installation environment including a wall outlet, or in a second installation environment including a hardwired power cable,
   wherein the food waste disposer system can be selectively implemented in the first installation environment by way of coupling the first plug to the power cord connection structure and the second plug to the wall outlet, and the food waste disposer system can be selectively implemented in the second installation environment by coupling lead wires of the hardwired power cable to the adapter and further coupling the adapter to the power cord connection structure.

2. The food waste disposer system of claim 1, wherein the adapter includes a third plug at a first end thereof and includes a coupling assembly at a second end thereof, wherein the third plug is configured to be coupled to the power cord connection structure.

3. The food waste disposer system of claim 2, wherein the third plug extends in a first direction that is opposed to, and substantially parallel to, a second direction in which the coupling assembly extends.

4. The food waste disposer system of claim 2, wherein the third plug extends in a first direction that is substantially perpendicular to a second direction in which the coupling assembly extends.

5. The food waste disposer system of claim 2, further comprising a coupler including an adjustable clamp feature through which the hardwire power cable can be supported, wherein the hardwired power cable is a Romex/BX cable.

6. The food waste disposer system of claim 5, wherein the coupling assembly is configured to support the coupler and additionally includes terminals by which the lead wires of the Romex/BX cable can be attached to the adapter, wherein the terminals include screws, insulation displacement type terminals, or direct contact terminals.

7. The food waste disposer of claim 5, further comprising an adapter cover configured to support the coupler and to be secured to the housing such that the adapter cover covers the adapter when the third plug is coupled to the power cord connection structure.

8. The food waste disposer system of claim 1, wherein the power cord connection structure is supported upon the bottom portion of the housing.

9. The food waste disposer system of claim 1, wherein the power cord connection structure is supported upon the first side portion of the housing.

10. The food waste disposer system of claim 1, wherein the first plug is a modified C13 type plug and the second plug is a NEMA 5-15 plug.

11. The food waste disposer system of claim 1, further comprising a motor overload switch by which the power cord connection structure is coupled to the AC input port, and where the AC-to-DC converter includes a full wave rectifier.

12. A food waste disposer system comprising:
a permanent magnet (PM) motor;
an AC-to-DC converter having an AC input port and a DC output port, wherein the DC output port is coupled at least indirectly to the PM motor;
a housing including a first side portion and a bottom portion;
a power cord connection structure supported at least indirectly upon the housing, wherein the power cord connection structure is coupled at least indirectly to the AC input port;
an adapter; and
a power cord including a first end with a first plug and a second end with a second plug, wherein the first plug is configured to be coupled to the power cord connection structure,
wherein the food waste disposer system is configured to be selectively implemented either in a first installation environment including a wall outlet by way of coupling the first plug to the power cord connection structure, or in a second installation environment including a hardwired power cable by coupling additional lead wires of the hardwired power cable to the adapter and further coupling the adapter to the power cord connection structure.

13. A method of installing a food waste disposer system, the method comprising:
providing the food waste disposer system to an installation environment, wherein the food waste disposer system includes:
a permanent magnet (PM) motor;
an AC-to-DC converter having an AC input port and a DC output port, wherein the DC output port is coupled at least indirectly to the PM motor;
a housing including a first side portion and a bottom portion; and
a power cord connection structure supported at least indirectly upon the housing, wherein the power cord connection structure is coupled at least indirectly to the AC input port;
determining whether the installation environment for the food waste disposer system includes a wall outlet or a Romex/BX cable; and
coupling, at least indirectly to the power cord connection structure, either:
a power cord including a first end with a first plug and a second end with a second plug, wherein the first plug is configured to be coupled to the power cord connection structure and the second end is configured to plug into the wall outlet; or
an adapter having a third end with a third plug, wherein the third plug is configured to be coupled to the power cord connection structure, and a coupling assembly including terminals configured to attach to lead wires of the Romex/BX cable.

14. The method of claim 13, wherein the coupling comprises coupling the adapter at least indirectly to the power cord connection structure, and the method further comprises:
securing the lead wires of the Romex/BX cable to the terminals of the coupling assembly; and
feeding a portion of the Romex/BX cable through a coupler that includes an adjustable clamp feature.

15. The method of claim 13, wherein the coupling comprises coupling the adapter at least indirectly to the power cord connection structure, and the method further comprises:
securing the lead wires of the Romex/BX cable to the terminals of the coupling assembly;
feeding a portion of the Romex/BX cable through an adapter cover; and
securing the adapter cover to the housing such that the adapter cover covers the adapter when the adapter is coupled at least indirectly to the power cord connection structure.

16. The method of claim 15, further comprising:
feeding a portion of the Romex/BX cable through a coupler that includes an adjustable clamp feature.

17. The method of claim 13, wherein the coupling comprises:
coupling the first plug of the first end of the power cord to the power cord connection structure; and
plugging the second plug of the second end of the power cable into the wall outlet.

* * * * *